United States Patent [19]

Smith et al.

[11] Patent Number: 4,675,820
[45] Date of Patent: Jun. 23, 1987

[54] INERTIAL REFERENCE SYSTEM

[75] Inventors: Jeffrey T. Smith, Renton; David E. Frazier, Issaquah; Ronald B. Leonardson, Redmond, all of Wash.

[73] Assignee: Sundstrand Data Control, Inc., Redmond, Wash.

[21] Appl. No.: 620,519

[22] Filed: Jun. 14, 1984

[51] Int. Cl.$^4$ .............................................. G06F 15/50
[52] U.S. Cl. ................................... 364/453; 364/571; 364/454; 73/178 R
[58] Field of Search .............. 364/443, 450, 453, 454, 364/571, 434; 33/318, 320, 324, 326; 73/178 R, 510

[56] References Cited

U.S. PATENT DOCUMENTS

| | | | |
|---|---|---|---|
| 3,763,358 | 10/1973 | Cargille | 364/453 |
| 4,070,674 | 1/1978 | Buell et al. | 364/453 |
| 4,212,443 | 7/1980 | Duncan et al. | 364/453 |
| 4,303,978 | 12/1981 | Shaw et al. | 364/453 |
| 4,321,678 | 3/1982 | Krogmann | 364/453 |
| 4,343,035 | 8/1982 | Tanner | 364/453 |
| 4,507,737 | 3/1985 | Lasarge et al. | 364/453 |

*Primary Examiner*—Gary Chin
*Attorney, Agent, or Firm*—Christensen, O'Connor, Johnson & Kindness

[57] ABSTRACT

An inertial sensor assembly (ISA) includes a cluster of three ring laser gyros, each gyro producing an output signal having a pulse repetition rate representative of the rate of angular deviation of the ISA about one of three coordinate axes X, Y, and Z. The ring laser gyros are synchronously dithered at a relatively constant rate. The ISA also includes a triad of three accelerometers, with each accelerometer producing an output signal representative of the rate of velocity deviation of the ISA along one of the X, Y, and Z coordinate axes. A first processor, P1, accumulates the pulses produced by each ring laser gyro over its dither period. The resultant counts are stored in registers for subsequent sampling by the P1 processor at a periodic sampling rate which is greater than the dither rate. The P1 processor then synchronizes each sampled pulse count to a common sampling interval, thereby eliminating errors otherwise caused by using positional data values taken at different times. The P1 processor also compensates the ring laser gyro and accelerometer-produced signals at the sensor and the system level for effects such as temperature, bias offsets, scale factor and misalignment by the use of compensating coefficients stored in electrically erasable, programmable read-only memory. The processed data from the P1 processor are passed to a P2 processor which performs navigational computations to thereby produce computed positional information.

8 Claims, 19 Drawing Figures

INERTIAL REFERENCE SYSTEM

FIELD OF THE INVENTION

This invention relates to an inertial reference system (IRS) for producing output signals representative of the inertial position of the object to which the IRS is affixed and, more particularly, the present invention pertains to an IRS employing dithered ring laser gyros as rotational displacement sensors, accelerometers for translational displacement sensors, a first processor, P1, for compensating the sensor-produced signals and synchronizing the gyro-produced signals to a common time interval and a second processor, P2, for performing navigational computations on the P1 processor synchronized and compensated data.

BACKGROUND OF THE INVENTION

Inertial reference systems are commonly employed in aircraft and other vehicular guidance systems. Such systems are packaged within a standard-size box, which is then mounted within the vehicle to be monitored. Sensors within the system detect both attitude and velocity changes with respect to three mutually perpendicular axes. These positional signals are then processed to produce output signals corresponding to positional changes of the vehicle with respect to a fixed, reference position.

In the past, angle rate sensing has been provided by gimballed, spinning wheel gyroscopes. The cost of such gyroscopes has been high, due to the careful assembly required of the precision machine parts employed. In addition, mechanical gyroscopes suffer many limitations, including mass unbalance, structure instabilities, a requirement for extreme cleanliness, and the need for a substantial "spin-up" time prior to use.

Many modern inertial reference systems now utilize ring laser gyroscopes as attitude sensors. The ring laser gyro employs an enclosed light path that is oriented in the sensitive plane of the gyroscope. Two laser beams simultaneously traverse the light path, one in a relative clockwise direction, and the other in a relative counterclockwise direction. When the enclosed path is rotated in inertial space, the clockwise and counterclockwise paths exhibit different lengths. As such, there is a frequency shift between the two traversing light signals, which frequency shift is representative of the rate of rotation of the gyro in its sensitive plane. Thus, by monitoring the difference in frequency of the laser beams traversing the path, an output signal representative of angular rotation rate may be produced. By providing a cluster of ring laser gyros, each with its sensitive plane oriented with respect to three mutually perpendicular axes, attitude changes in any direction may be accurately monitored.

A clearly identified problem with ring laser gyros is a phenomenon known as "lock-in". As the rate of rotation of the gyro is reduced, the two oppositely traversing light rays will frequently lock to a common frequency long before the rotational rate of the gyro has fallen to zero. As a result, resolution of small angular rate deviations is lost.

One way to prevent lock-in is to dither the gyroscope in its sensitive axis. By applying a sufficient dither motion to the gyroscope, the two oppositely traversing light beams constantly experience rate changes sufficient to prevent the two beams from locking to a common frequency.

In inertial reference system applications, the three ring laser gyros forming a cluster are all mounted to a common structure, designed to orient each gyro in one of the three mutually perpendicular axes. If all ring laser gyros are dithered synchronously, this could result in the excitation of resonant frequencies of the gyros and support structure, thereby producing undesired deflections and corresponding error output terms from the gyros. As such, it is imperative that the three ring laser gyros be dithered asynchronously.

The signal produced by a ring laser gyro is digital in nature, having a pulse repetition rate corresponding to the rate of gyro angular displacement. To eliminate the dither signal from the produced gyro signal, the count of the gyro pulse output is accumulated over one full dither cycle, and measured at dither zero crossings. Inasmuch as the three gyros are dithered asynchronously, the corresponding gyro dither zero crossings occur asynchronously. The navigational algorithms used to process the data and produce positional output information assume, however, that the rate data for each of the three mutually perpendicular inertial reference system axes is taken at the same point in time. Thus, to avoid errors in the produced positional data for the inertial reference system, a means must be provided to resynchronize each of the three gyro signals to a common interval.

Heretofore, inertial reference systems employing ring laser gyros have been relatively large in size, and quite expensive in cost. As such, the systems lend themselves to application only in larger aircraft. It is desirable to reduce the size and cost of ring laser gyro-based inertial reference systems such that they are suitable for a broad application for all sizes of aircraft or other vehicles. As the ring laser gyros and accelerometers are packaged in smaller enclosures, special attention must be paid to the temperature compensation of the sensors, both at an individual sensor level, as well as a system level. Also, bias and offset compensation both at a sensor and a system level should be provided, along with sculling correction for the accelerometers and coming correction for the gyroscopes. Further, the correction factors used for temperature, bias, and other error source correction must be capable of inexpensive and high-speed recalibration, thereby minimizing the downtime of such devices, while maximizing accuracy. Further, the functions of the inertial reference system should be modularized in such a way that a single basic inertial reference system configuration may be quickly and inexpensively modified for use in any of a variety of applications.

SUMMARY OF THE INVENTION

The present invention, therefore, is directed to an improved inertial reference system. This improved inertial reference system may be constructed in a small enclosure and is designed to minimize the use of expensive components, thereby reducing overall cost. In addition, the present inertial reference system may be quickly and inexpensively modified for particular applications. To assure high accuracy, the system employs high-level temperature, coning, and sculling correction, as well as both individual sensor and system correction for bias, misalignment, and other error sources. The correction factors used to implement such compensation are easily and quickly changed, thereby providing ease in recalibration.

In addition, a unique resynchronizing system synchronizes each gyro zero crossing output signal to a common time interval, thereby assuring high accuracy in the produced position signals. The resynchronizing is accomplished by circuitry that is relatively inexpensive and consumes a minimum of space.

Briefly, according to the invention, an inertial reference system comprises an inertial sensor assembly. The inertial sensor assembly includes gyros for producing asynchronous output signals $\Delta\theta_x$, $\Delta\theta_y$, and $\Delta\theta_z$ representative of the change in angular position of the inertial sensor assembly with respect to three mutually orthogonal coordinate axes X, Y, and Z, respectively. Also provided in the inertial sensor assembly are accelerometers for producing output signals $\Delta V_x$, $\Delta V_y$, and $\Delta V_z$ representative of the change in velocity of the inertial sensor assembly in the X, Y, and Z coordinate axes, respectively.

A first processor, P1, predeterminedly accesses and processes the $\Delta\theta_x$, $\Delta\theta_y$, $\Delta\theta_z$, $\Delta V_x$, $\Delta V_y$, and $\Delta V_z$ signals. The P1 processor includes means for:

(a) providing coning correction for the $\Delta\theta_x$, $\Delta\theta_y$, and $\Delta\theta_z$ signals, (b) providing sculling correction for the $\Delta V_x$, $\Delta V_y$, and $\Delta V_z$ signals, and (c) temperature compensating the $\Delta\theta_x$, $\Delta\theta_y$, $\Delta\theta_z$, $\Delta V_x$, $\Delta V_y$, and $\Delta V_z$ signals.

A second processor, P2, performs navigational computations utilizing the P1 processed $\Delta\theta_x$, $\Delta\theta_y$, $\Delta\theta_z$, $\Delta V_x$, $\Delta V_y$, and $\Delta V_z$ signals to produce output signals related to the inertial position of the inertial sensor assembly.

Preferably, the gyros are comprised of a cluster of three ring laser gyros, with each ring laser gyro being mounted to sense angular deviation of the inertial sensor assembly in one of the X, Y, and Z coordinate axes. Each ring laser gyro produces a first output signal $+\Delta\theta_x$, $+\Delta\theta_y$, $+\Delta\theta_z$ having a pulse repetition rate proportional to the rate of angular displacement of the ring laser gyro in a reference clockwise direction and a second output signal $-\Delta\theta_x$, $-\Delta\theta_y$, and $-\Delta\theta_z$ having a pulse repetition rate proportional to the rate of angular displacement of the ring laser gyro in a reference counterclockwise direction.

Dither means are provided for applying an asynchronous periodic dither motion to each of the ring laser gyros.

The P1 processor preferably includes a gyro counter for accumulating the pulse count of each ring laser gyro-produced first output signal and each ring laser gyro-produced second output signal over each dither cycle. Gyro storage is provided for storing the accumulated pulse counts for each of the gyro output signals over each dither cycle. The P1 processor logic periodically samples the gyro storage and predeterminedly processes the stored pulse counts to produce angular rate signals synchronized to a common interval. This interval, preferably, is the P1 logic sampling time.

The period of each dither cycle is, preferably, longer than the sampling period of the P1 processor logic. The P1 processor further includes a clock for producing a periodic signal having a significantly higher frequency than the frequency of the P1 processor logic sampling rate. A resync timer accumulates a count of the clock signal during the interval between the end of each dither cycle for each ring laser gyro and each subsequent logic sampling time. The P1 processor logic processes the stored pulse count and the resync timer stored count for synchronizing each ring laser gyro-produced signal to the logic sampling interval.

The P1 processor further includes means for identifying a first condition wherein the sampled pulse count changed from the previous sampling interval and a second condition wherein, due to the dither period being longer than the logic sampling period, the sampled pulse count remained the same as the previous sampled pulse count. In response to the first condition, the P1 processor logic interpolates a value for the resynchronized pulse count between the sampled pulse counts for the preceding two dither cycles. In response to the second condition, the P1 processor logic extrapolates the value for the resynchronized pulse count from the sampled pulse counts for the preceding two dither cycles.

The inertial sensor assembly accelerometers preferably comprise a triad of three accelerometers, with each accelerometer being mounted to sense acceleration of the inertial sensor assembly in one of the X, Y, and Z coordinate axes. Each accelerometer produces a first output signal $+\Delta V_x$, $+\Delta V_y$, $+\Delta V_z$ having a pulse repetition rate proportional to the acceleration of the accelerometer in a reference positive direction, and a second output signal $-\Delta V_x$, $-\Delta V_y$, $-\Delta V_z$ having a pulse repetition rate proportional to acceleration in a reference negative direction of the accelerometer.

The P1 processor includes an accelerometer counter for accumulating the pulse count of each accelerometer-produced output signal over a predetermined periodic interval. Accelerometer storage is provided for storing the accumulated pulse counts for each of the accelerometer output signals over each of the predetermined periodic intervals. The P1 logic periodically samples the accelerometer storage and predeterminedly processes the stored pulse counts.

Further, the P1 processor preferably includes temperature compensation for the ring laser gyro and accelerometer-produced signals, including means for:

(a) monitoring the temperature of the gyros, (b) monitoring the temperature of the accelerometers, (c) storing predetermined coefficients for the gyros and accelerometers, these coefficients providing correction factors for the gyro and accelerometer produced output signals as a function of temperature. P1 processor logic produces temperature-compensated gyro and accelerometer signals responsive to the monitored temperatures and stored coefficients.

Also, the P1 processor preferably includes means for storing bias, scale factor and misalignment-related correction factors for the gyros and accelerometers and the P1 logic produces bias, scale factor and misalignment-corrected gyro and accelerometer signals responsive to the stored bias, scale factor and misalignment-related correction factors.

The stored correction factors for temperature, bias and misalignment correction are all stored in electrically erasable, programmable read-only memory, whereby these factors may be easily changed, and the inertial reference system quickly recalibrated, by writing in new correction factors.

DETAILED DESCRIPTION

Figure 1:
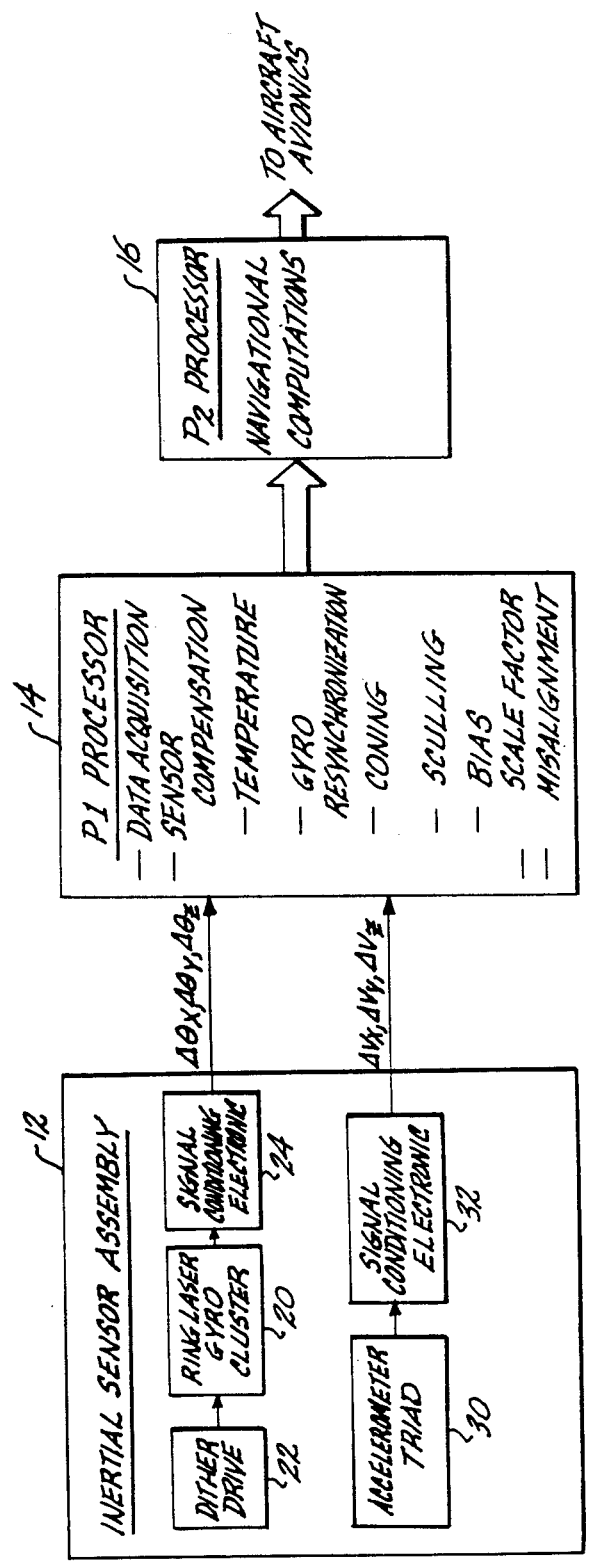
FIG. 1 is a block diagram illustrating the principal features and functions of the inertial sensor assembly, the P1 processor and the P2 processor.

FIG. 1 is a block diagram illustrating the preferred arrangement of the present inertial reference system (IRS). The IRS is divided into three principal modules, including an inertial sensor assembly (ISA) 12, a P1 processor 14, and a P2 processor 16.

The ISA unit 12 contains the positional sensors. Attitude sensing is provided by a cluster of three ring laser gyros 20. Each ring laser gyro (described in more detail with respect to FIG. 3) is mounted with its sensitive axis normal to one of three mutually orthogonal coordinate axes X, Y, and Z. The output from each gyro is a digital signal having a pulse repetition rate proportional to the rate of angular displacement of the ISA 12 about the gyro's sensitive axis.

As discussed above, ring laser gyros are subject to a condition known as "lock-in" when operated at low angular displacement rates. To prevent gyro lock-in, a dither drive applies a sinusoidal dither motion to each ring laser gyro in gyro cluster 20 at a periodic rate. To prevent cross-coupling among the three ring laser gyros in the cluster 20 the dither drive 22 drives the ring laser gyros asynchronously.

The angular displacement-related signals out of the ring laser gyro cluster 20 are processed through signal conditioning electronics 24. In addition, status signals from the ring laser gyro cluster, such as operating temperature, are provided through the signal conditioning electronics 24.

An accelerometer triad 30 includes three accelerometers, each having its sensitive axis aligned with one of the three mutually orthogonal coordinate axes X, Y, and Z. Preferably, each accelerometer in accelerometer triad 30 is comprised of a digital accelerometer, having an output pulse repetition rate related to the rate of change of velocity of each gyro along its sensitive axis. A more detailed description of each accelerometer is given with respect to FIG. 4.

The output signals from the accelerometer triad 30 are processed through signal conditioning electronics 32. Also provided by signal conditioning electronics 32 are status signals for the accelerometer triad 30, such as operating temperature.

The three ring laser gyro cluster 20 signals $\Delta\theta_x$, $\Delta\theta_y$, and $\Delta\theta_z$, as well as the three accelerometer 30 signals $\Delta V_x$, $\Delta V_y$, and $\Delta V_z$ are passed to the inputs of the P1 processor 14.

The functions of the P1 processor 14 are to acquire and store, as well as provide compensation for the sensor data. Inasmuch as the gyro and accelerometer-produced signals are digital in nature, the data acquisition function of the P1 processor 14 involves the accumulation and storage of the input pulses over periodic cycles. A detailed description of these functions is provided with respect to FIGS. 5 and 6.

To correct for various errors in the gyro and accelerometer signals, the P1 processor 14 performs sensor signal compensation. By empirical testing, temperature-induced errors in the gyro cluster 20 produced signals, and the accelerometer triad-produced signals 30 are modelled as a second-order polynomial. The coefficients for this polynominal are stored in memory provided in the P1 processor 14. As discussed with respect to FIG. 5, this memory is preferably electrically erasable, programmable read-only memory (EEPROM) which facilitates convenient loading and changing of the coefficients without effecting a hardware change.

As mentioned hereinabove, due to the fact that the ring laser gyros in the ring laser gyro cluster 20 are dithered at asynchronous rates, and it is desired to accumulate the digital outputs of each ring laser gyro over a full dither period to thereby integrate out the dither signal, the $\Delta\theta_x$, $\Delta\theta_y$, and $\Delta\theta_z$ signals supplied to the P1 processor 14 from the ISA 12 are necessarily asynchronous. It is desirable to synchronize the three signals to a common time interval to both provide coning correction and to perform navigational computations on positional signals taken at the same instant in time. In a manner described in great detail with respect to FIGS. 10 through 15, the P1 processor 14 performs gyro signal resynchronization.

The gyro signals $\Delta\theta_x$, $\Delta\theta_y$, and $\Delta\theta_z$ must also be provided with coning correction. Coning correction is required as a result of errors induced in the gyro-produced signals due to an environment having a spectrum of vibration which is detectable by the gyros. Specific techniques for providing coning correction are well known to those of ordinary skill in the art and, for conciseness, will not be described in detail herein.

The accelerometer signals $\Delta V_x$, $\Delta V_y$, and $\Delta V_z$ must be provided with sculling correction. Sculling correction is required due to the fact that linear and angular vibrations in the environment are sensed by the accelerometers. Specific techniques for providing sculling correction are well known to those of ordinary skill in this art and, for conciseness, will not be described in detail herein. The coefficients required for sculling correction are similarly stored in EEPROM.

Further, the P1 processor 14 provides bias, scale factor and misalignment correction for both the gyro cluster 20 and the accelerometer triad 30. The gyros and accelerometers are subject to offset biases and scale factor error that are corrected by the bias and scale factor compensation. Also, known misalignments of each sensor with respect to its corresponding coordinate axis create sensor output errors. Such misalignment errors may be small for gyro cluster 20 whereby correction is not required, whereas misalignment correction for the accelerometer triad 30 is essential for minimizing system error. Bias, scale factor and misalignment errors at the individual sensor level, and at the system level are provided by coefficients stored in EEPROM within the P1 processor 14. This bias, scale factor and misalignment correction is described in detail with respect to FIGS. 16 and 17.

The fully compensated and resynchronized gyro signals, as well as the compensated acceleration signals are then passed to the P2 processor 16. The function of the P2 processor 16 is to process the attitude rate and linear acceleration signals through navigational computations to produce output positional data. This positional data is then passed to utilization equipment, such as the aircraft avionics onboard an airplane.

A particular feature of the present invention is that in being divided into the three main components (i.e., the ISA 12, P1 processor 14, and P2 processor 16) the IRS is designed in such a way that it may be easily modified for various applications and easily serviced. If, for example, one of the gyro clusters 20 or accelerometer triads 30 requires replacement, new compensating coefficients may be easily loaded into the EEPROM of the P1 processor 14. Further, the navigational equations used by the P2 processor 16 may be conveniently changed or, in the alternative, a replacement, fully compatible P2 processor 16 may be easily installed. Thus, the functional arrangement of the individual modules 12, 14, and 16 for the present IRS renders a design that is very easy to modify or repair.

Figure 2:
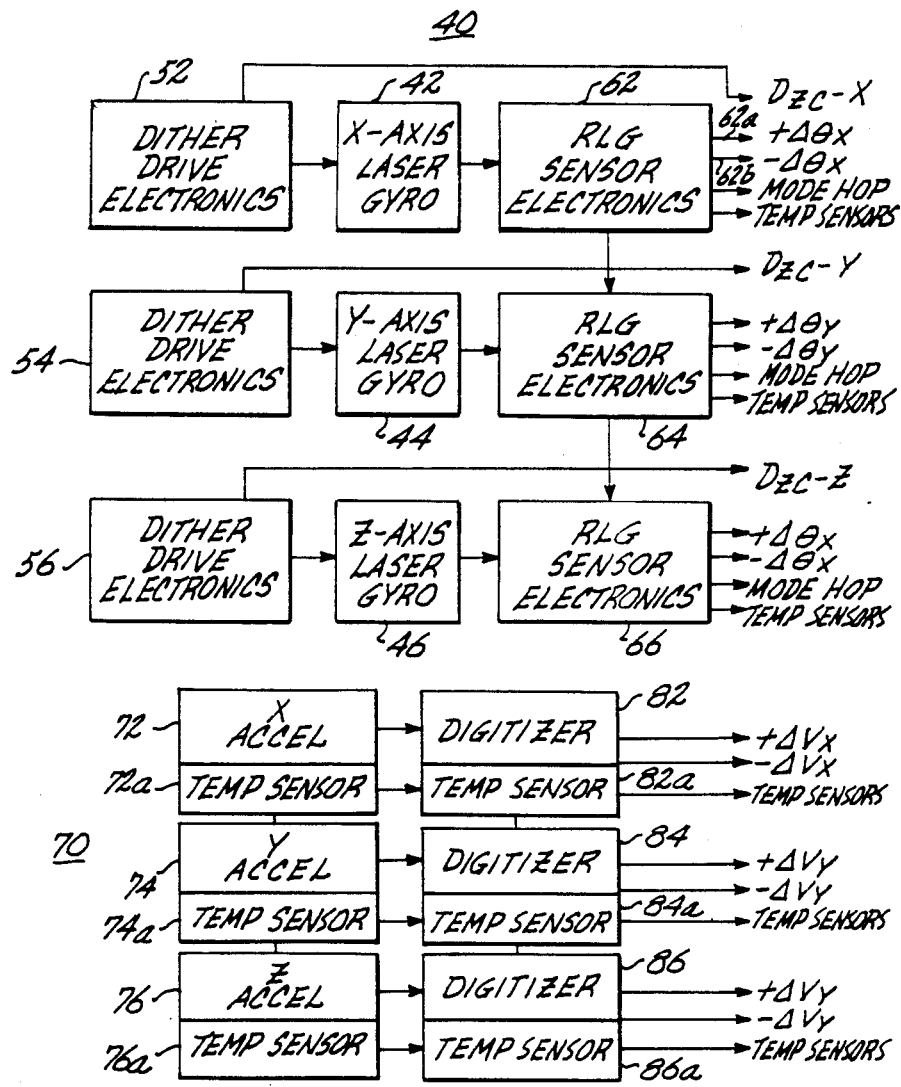
FIG. 2 is a detailed block diagram setting forth the principal components of the ring laser gyro cluster and the digital accelerometer triad.

FIG. 2 is a detailed block diagram of the inertial sensor assembly 12 of FIG. 1. Shown is a cluster, indicated generally at 40, of three ring laser gyros 42, 44, 46, each having its sensitive axis aligned with one of three mutually orthogonal coordinate axes X, Y, and Z, respectively. To prevent lock-in of each laser gyro 42, 44, and 46, dither drive is provided by three dither drive units 52, 54, and 56, respectively. The dither drive units 52, 54, and 56 apply asynchronous, periodic dither motion signals to each of the corresponding ring laser gyros 42, 44, and 46 about their sensitive axes. The three dither signals $D_{zc-x}$, $D_{zc-y}$, and $D_{zc-z}$ are provided on output lines from each of the three dither drive units 52, 54, and 56, respectively.

Each ring laser gyro 42, 44, and 46 produces an output digital signal having a pulse repetition rate proportional to the rate of angular displacement of each gyro 42, 44, and 46 about its coordinate axis. These signals are processed through three corresponding ring laser gyro sensor electronics units 62, 64, and 66. The ring laser gyro sensor electronics units 62, 64 and 66 output for each ring laser gyro comprises a first line having a signal with a pulse repetition rate related to angular displacement of the ring laser gyro in a reference clockwise direction, and a second line having a signal with a pulse repetition rate representative of ring laser gyro angular displacement in a reference counterclockwise direction. Thus, the ring laser sensor electronics unit 62 for the X axis includes a first output line 62a with a signal having a pulse repetition rate proportional to the rate of angular displacement of the X axis ring laser gyro in a clockwise direction, this signal being designated $+\Delta\theta_x$. A second ring laser gyro sensor electronics 62 output line 62b carries a signal $-\Delta\theta_x$, having a pulse repetition rate representative of the rate of angular displacement of the X axis laser gyro 42 in a counterclockwise direction. Corresponding signals $+\Delta\theta_y$, $-\Delta\theta_y$, $+\Delta\theta_z$, and $-\Delta\theta_z$ are provided by the Y and Z axes ring laser gyro sensor electronics 64, 66, respectively.

As is discussed in greater detail with reference to FIG. 3, during operation the ring laser gyros 42, 44, and 46 experience mode hops in their frequencies of oscillation. Each ring laser gyro sensor electronics unit 62, 64, and 66 produces an output mode hop signal corresponding to a mode hop condition in its associated ring laser gyro 42, 44, and 46, respectively.

Due to the fact that the signals produced by each ring laser gyro 42, 44, and 46 are temperature dependent, one or more temperature sensors monitors the temperature of each ring laser gyro 42, 44, and 46. The ring laser gyro sensor electronics units 62, 64, and 66 process these temperature sensor signals, providing corresponding temperature sensor output signals.

Also provided in the ISA is an accelerometer triad, indicated generally at 70. The accelerometer triad 70 is comprised of three analog accelerometers 72, 74, 76, each having its sensitive axis aligned with one of the three mutually orthogonal coordinate axes X, Y, and Z, respectively. The analog accelerometers 72, 74, and 76 produce analog output signals corresponding to the rate of change of velocity of each accelerometer along its sensitive axis. These analog signals are converted to digital signals by corresponding digitizers 82, 84, and 86.

Each digitizer 82, 84, and 86 produces a pair of output signals $+\Delta V_x$, $-\Delta V_x$, $+\Delta V_y$, $-\Delta V_y$, and $+\Delta V_z$, $-\Delta V_z$, respectively. The signals $+\Delta V_x$, $+\Delta V_y$, and $+\Delta V_z$ are digital signals having a pulse repetition rate corresponding to accelerations of each corresponding accelerometer 72, 74, and 76 in a reference positive direction. The second outputs $-\Delta V_x$, $-\Delta V_y$, and $-\Delta V_z$ are digital signals having a pulse repetition rate related to accelerations of the corresponding accelerometers 72, 74, and 76, respectively, in a reference negative direction.

Inasmuch as the accelerometers 72, 74, and 76 and the digitizers 82, 84, and 86 produce outputs that are frequency dependent, each has associated with it a temperature sensor 72a, 74a, 76a, 82a, 84a, and 86a, respectively. The temperature sense signals from the temperature sensors 72a, 74a, 76a, 82a, 84a, and 86a are provided as output temperature sensor signals.

Figure 5:
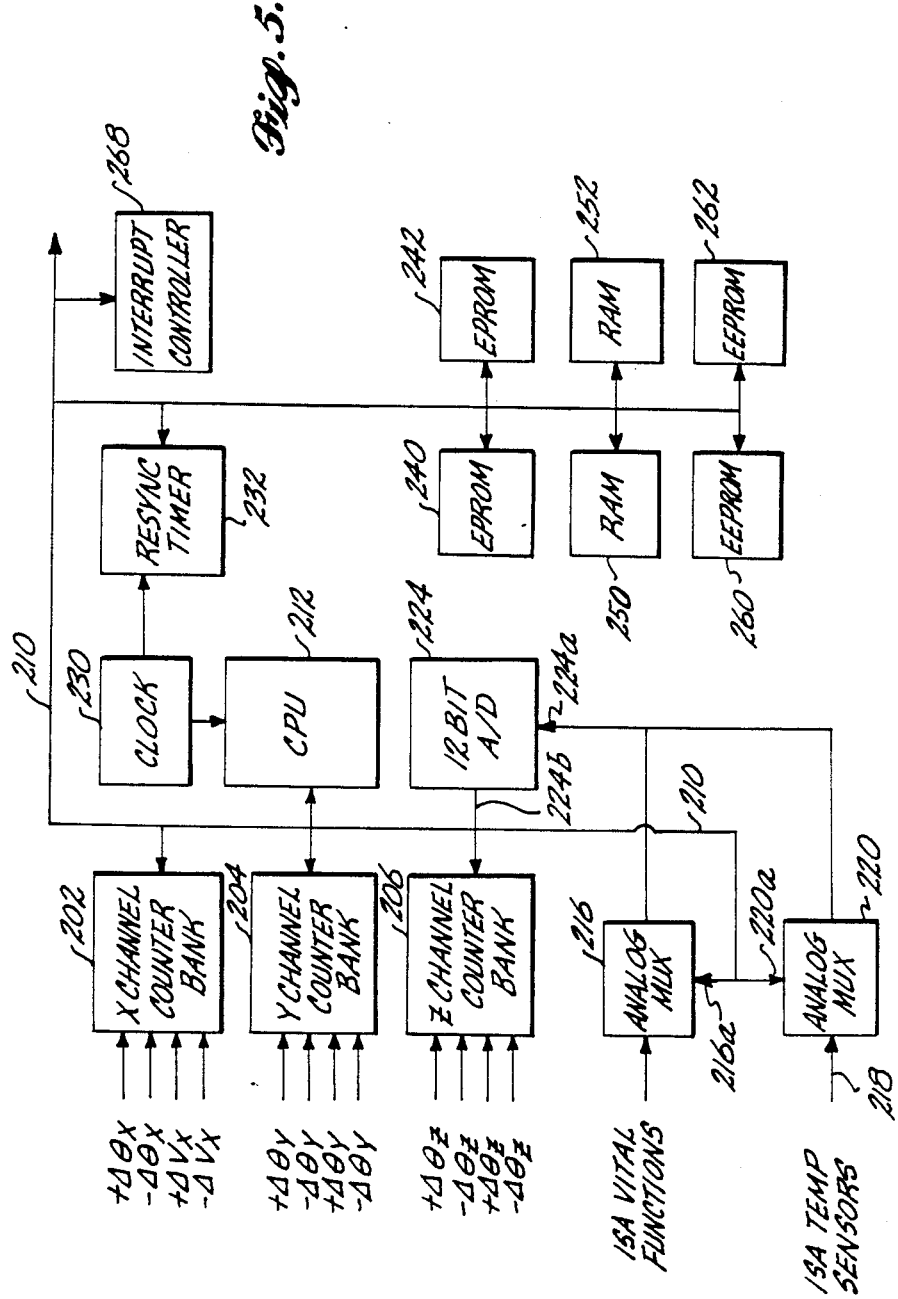
FIG. 5 is a detailed block diagram setting forth the principal components of the P1 processor.

The various indicated output signals from the ISA are routed to the inputs of the P1 processor, described in detail with respect to FIG. 5.

Figure 3:
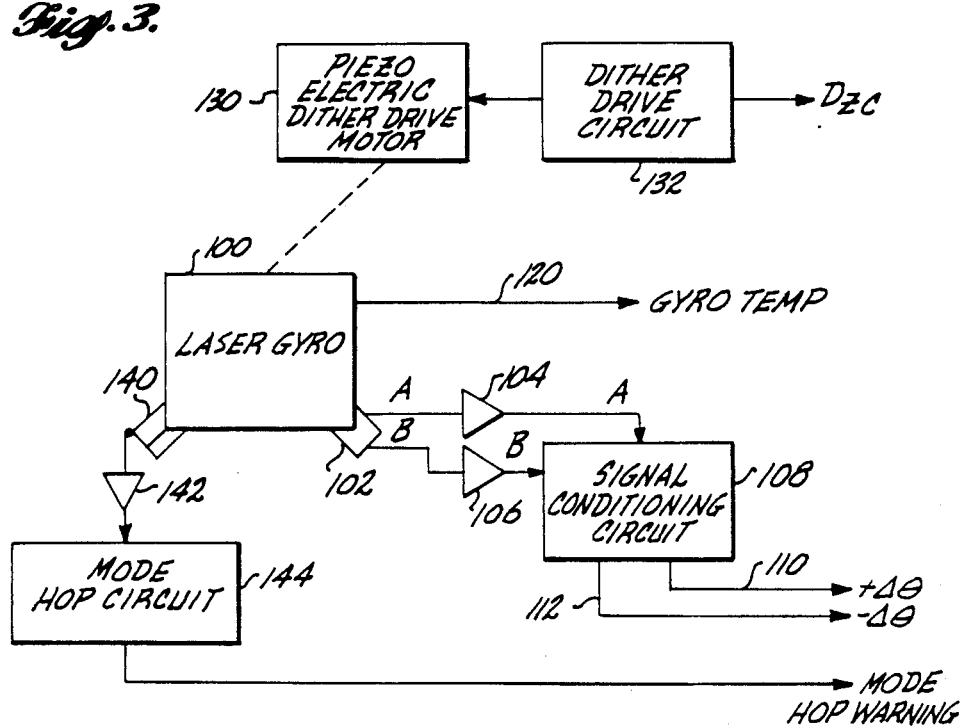
FIG. 3 is a detailed block diagram of the ring laser gyro and its associated dither drive and signal-conditioning circuitry.

FIG. 3 is a detailed block diagram illustrating a ring laser gyro and its associated dither drive and output processing circuits. The laser gyro 100 includes a closed light path for two laser beams, each of which traverses the light path in an opposite direction. Rotation of the laser gyro in the plane containing the light path effectively varies the path length for each of the traversing beams, causing a corresponding frequency difference between the two light beams traversing the light path. This frequency difference is detected by means of producing interference patterns between the two light beams and monitoring the interference patterns via photodetectors 102. The photodetectors 102 produce an output signal A representative of clockwise rotation of the laser gyro, and an output signal B representative of counterclockwise laser gyro rotation. These signals are passed through corresponding photopreamps 104, 106 and are supplied as inputs to the signal conditioning circuit 108. Signal-conditioning circuit 108 processes the A and B input signals to produce, on a first output line 110, a signal $+\Delta\theta$ having a pulse repetition rate proportional to the clockwise angular rotation rate of the laser gyro 10 in its sensitive axis. On a second line 112, the signal-conditioning circuit 108 produces an output signal $-\Delta\theta$ having a pulse repetition rate proportional to the counterclockwise angular rotation rate of the laser gyro 100 in its sensitive axis.

The signals produced by the laser gyro 100 and its associated circuitry 102, 104, 106, and 108, are known to be temperature dependent. The temperature of the laser gyro is monitored by one or more temperature sensors (not shown) which produce output gyro temperature sense signals on a line 120.

To prevent "lock-in" of the two, oppositely traversing laser beam signals at small angular displacement rates of the laser gyro 100, a piezoelectric dither drive motor 130 dithers the laser gyro 100 in its sensitive axis at a periodic rate.

The controlling signals to the dither drive motor 130 are provided by the dither drive circuit 132, which also produces an output signal $D_{zc}$ corresponding to the zero crossing times of the dither drive motor.

As the laser gyro 100 heats, the closed light path extends causing a corresponding change in the path length for the two traversing light beams. A photodetector 140 monitors the laser beams, producing an output signal that is amplified in a preamplifier 142 and fed to the input of a mode hop circuit 144. The mode hop circuit, in response to the signal from the amplifier 142, produces an output mode hop warning signal in the event that the light beam path has changed to the point that a shift in the frequency mode of the light signals is imminent. In this way, the P1 processor can monitor the mode of the laser gyro 100.

The various output signals produced by the ring laser gyro shown in FIG. 3 are routed to the P1 processor inputs for processing, as is described in detail with respect to FIG. 5.

Figure 4:
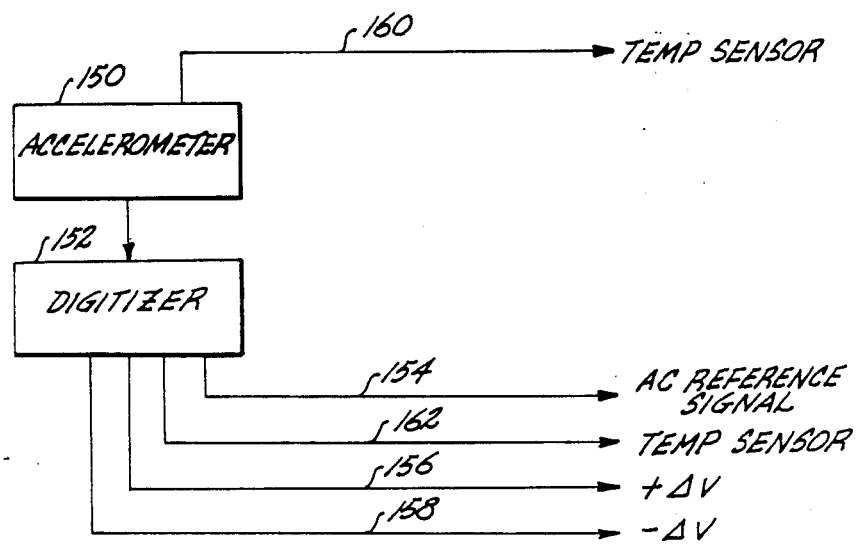
FIG. 4 is a detailed block diagram of the accelerometer and its corresponding digitizer.

FIG. 4 is a detailed block diagram illustrating a single digital accelerometer for use in the inertial sensor assembly. Shown is an analog accelerometer 150 that produces an analog output signal proportional to the rate of acceleration of the accelerometer 150 along its sensitive axis. Preferably, a "Q-FLEX" type accelerometer, available from Sundstrand Data Control of Redmond, Wash., is used.

The output from the analog accelerometer 150 is passed to the input of a digitizer 152. The digitizer 152 processes the analog output signal from the accelerometer 50, as well as an input AC reference signal on a line 154, to produce a pair of output signals $+\Delta V$, $-\Delta V$. The $+\Delta V$ signal is a digital signal having a pulse repetition rate proportional to acceleration of the accelerometer 150 in a reference positive direction along its sensitive axis. The $-\Delta V$ signal has a pulse repetition rate proportional to acceleration of the accelerometer 150 in a reference negative direction along its sensitive axis. The $+\Delta V$ and $-\Delta V$ signals are provided on output lines 156, 158, respectively.

Inasmuch as the signals produced by the accelerometer 150 and the digitizer 152 are temperature dependent, temperature sensors (not shown) monitor the temperatures of the accelerometer 150 and digitizer 152 producing corresponding temperature sensor output signals on lines 160, 162, respectively. The various output signals from the digital accelerometer of FIG. 4 are fed to the P1 processor, as is discussed in detail with respect to FIGS. 5 and 6.

While various implementations of the digital accelerometer shown in FIG. 4 are possible, the preferred embodiment is described in copending U.S. patent application Ser. No. 620,441, invented by Douglas MacGugan et al., entitled "DIGITAL ACCELEROMETER", filed on June 14, 1984 and assigned to the same assignee.

FIG. 5 is a detailed block diagram illustrating the principal components of the P1 processor, indicated generally at 200. The inputs to the P1 processor are the above-described outputs from the inertial sensor assembly.

Provided as inputs to an X channel counter bank 202 are the gyro and accelerometer signals $+\Delta\theta_x$, $-\Delta\theta_x$, $+V_x$, and $-V_x$, respectively. The corresponding gyro and accelerometer signals are provided as inputs to the Y channel counter bank 204 and the Z channel counter bank 206. The function of the channel counter banks 202, 204, and 206 is to accumulate the various digital signals from the inertial sensor assembly over each dither cycle for each ring laser gyro, and over a reference time interval for each digital accelerometer. Once the counts have been accumulated for the various sensor signals, these values are then loaded into storage provided within the counter banks, 202, 204, and 206. These stored counts are then made available over an address and data bus 210, providing access by the P1 processor CPU 212. A detailed discussion of the counter banks 202, 204, and 206 is given with respect to FIGS. 7 through 10.

Coupled over a multiline bus 214 to an input analog multiplexer 216 are the various inertial sensor assembly "vital functions". These vital functions are status signals indicating, for example, a mode hop condition of any of the ring laser gyros. Other typical status signals, such as a fault condition in a ring laser gyro or a digital accelerometer may also be provided on the multiple-line bus 214.

The various aforedescribed inertial sensor assembly temperature sensor signals are provided over a multiple-line bus 218 to a second analog multiplexer 220. The analog multiplexers 216, 220 have address inputs 216a, 220a that are connected to the P1 processor address and data bus 210. Thus, the CPU 212 accesses any of the ISA vital function signals on bus 214, or any of the ISA temperature sensor signals on bus 218 by appropriate addressing on the address and data bus 210. The selected ISA vital function or ISA temperature sensor signals are then output from the analog multiplexers 216, 220 and passed to the input 224a of a 12-bit analog-to-digital converter 224. In the known manner, the 12-bit analog-to-digital converter 224 converts the analog signal at its input 224a to a corresponding digital signal, which is then applied at its output 224b to the address and data bus 210.

At predetermined intervals, the CPU 212, preferably comprised of a commercially available type Z8002 microprocessor, accesses the various sensor signals from the channel counter banks 202, 204, and 206, as well as the ISA vital function signals and the ISA temperature sensor signals as processed through the analog multiplexers 216, 222, respectively, and the 12-bit analog-to-digital converter 224.

The operating rate of the CPU 212 is determined by a reference clock signal produced by a clock 230. This high-frequency clock signal is also passed as an input to a resync timer 232. As is described in great detail with respect to FIGS. 7 and 9, the resync timer 232 produces a signal representative of the time between a sampling period by CPU 212 of a counter bank 202, 204, and 206 and the corresponding end of a ring laser gyro dither cycle. The resync timer 232 stored value is used by the CPU 212 to synchronize the various ring laser gyro signals to a common time interval.

The sampling period time, as well as the dither end of cycle signal are provided to the resync timer 232 over the P1 processor address and data bus 210.

The programming for the CPU 212 is stored in a pair of erasable, programmable read-only memory (EPROM) chips 240, 242. In one construction of the invention, sufficient programming capability was provided by each EPROM 240, 242 having a memory capacity of 16k×8.

While the detailed program stored in the EPROMs 240, 242 is not given herein, such programming is manifestly apparent to one of ordinary skill in this art based upon the discussion provided herein of the operation of CPU 212.

During the course of performing computations on the input data, the CPU 212 makes use of two random-access memories (RAMs) 250, 252. In one implementation of the invention, each RAM 250, 252 had a provided memory capacity of 8K×8.

Figure 17:
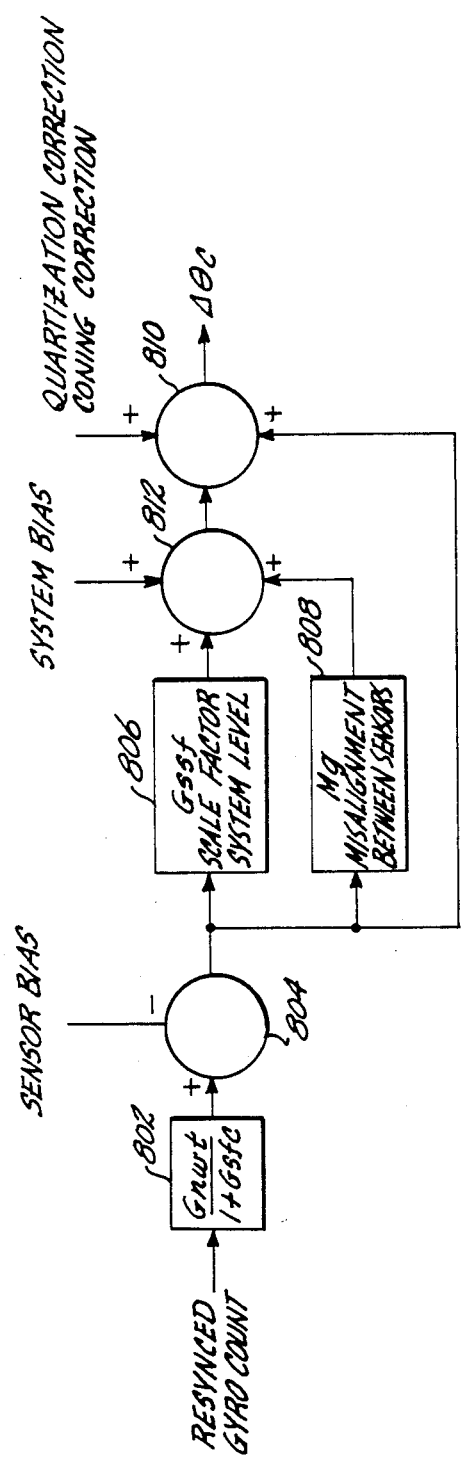
FIG. 17 is a flow chart illustrating the procedure performed by the P1 processor to provide bias, scale factor misalignment, and coning correction to the gyro-produced output signals.
Figure 19:
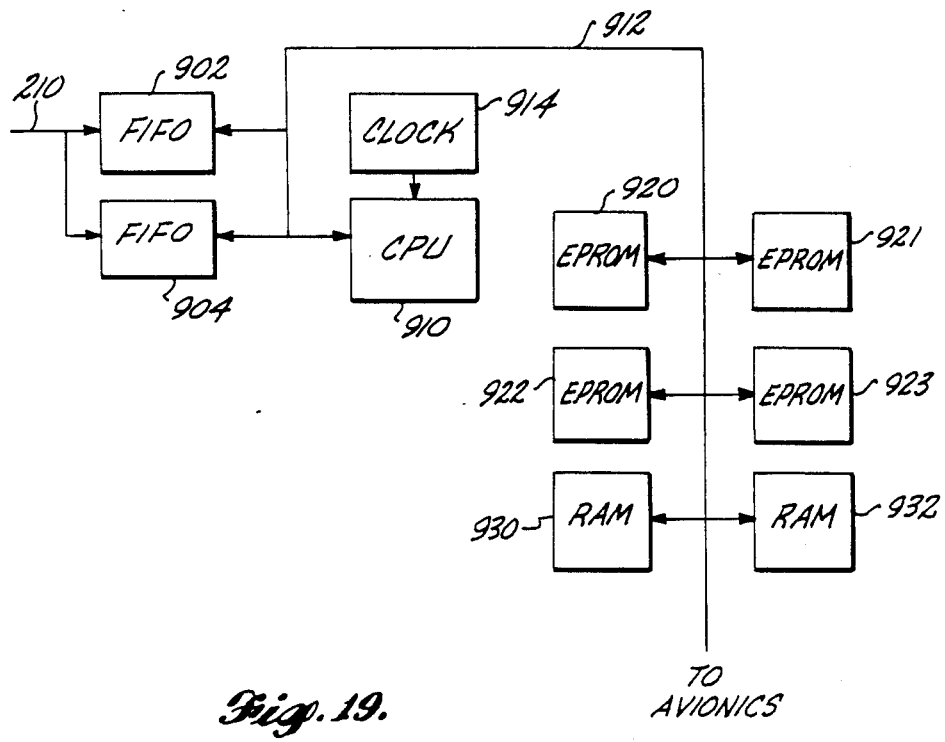
FIG. 19 is a detailed block diagram of the P2 navigational processor.

As is described in detail with respect to FIGS. 17 and 19, the P1 processor stores coefficients used for temperature, scale factor, bias, and misalignment correcting the various gyro and accelerometer input signals. These coefficients are stored in two electrically erasable, programmable read-only memory (EEPROM) chips 260, 262. A characteristic of the EEPROM chips 260, 262 is that a user may easily change the stored coefficient without requiring a hardware change of the inertial reference system. Thus, recalibration of the disclosed inertial reference system is accomplished quickly and inexpensively. In one embodiment of the invention, each EEPROM chip 260, 262 was provided with a 2K×8 memory size.

The CPU 212 accesses the EPROMs 240, 242, the RAMs 250, 252, and EEPROMs 260, 262 over the system address and data bus 210. The resynchronized, compensated gyro signals, and the compensated accelerometer signals are routed by the CPU 212 over the address and data bus 210 to the navigation processor P2, described in detail with respect to FIG. 19.

An interrupt controller 268 applies eight periodic interrupt signals to the P1 processor data and address bus 210 causing CPU 212 to perform the procedures corresponding to the particular interrupt.

Figure 6:
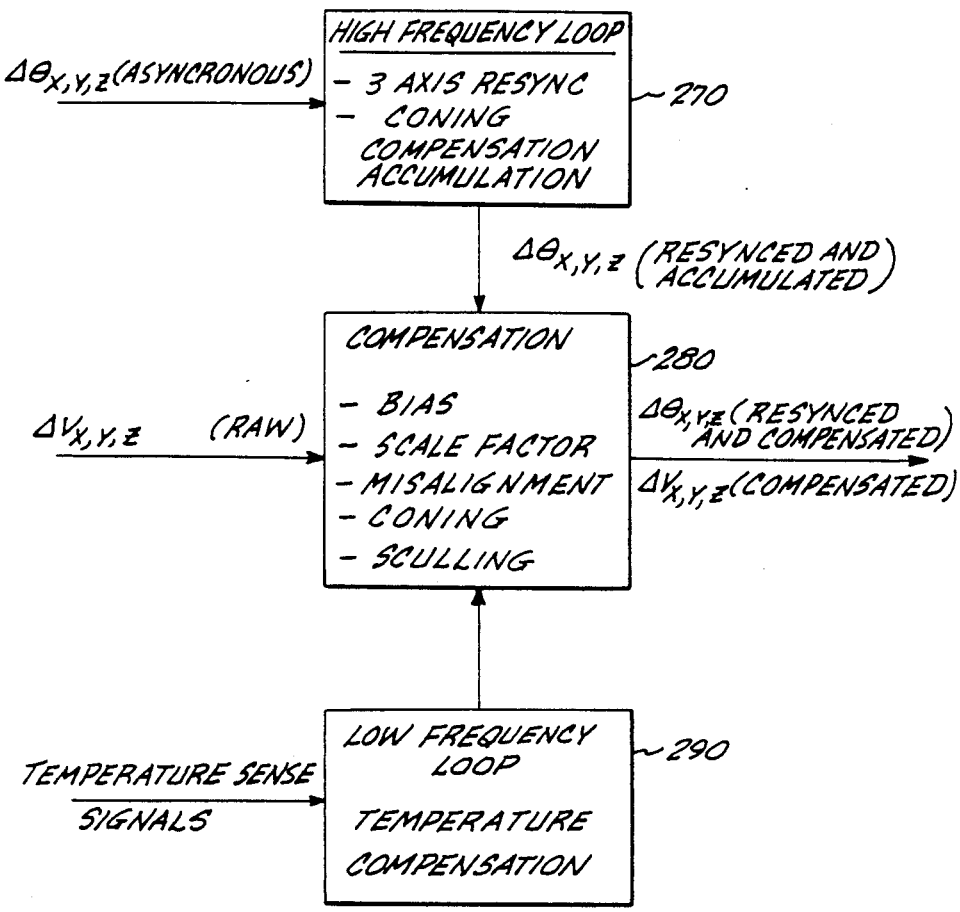
FIG. 6 is a block diagram depicting the resyncing and compensation hierarchy performed by the P1 processor.

FIG. 6 is a block diagram illustrating a P1 processor activity in response to the three types of interrupts.

The highest frequency interrupt, at block 270, causes the P1 processor to enter the high frequency loop. In this loop, the $\Delta\theta_x$, $\Delta\theta_y$ and $\Delta\theta_z$ asynchronously produced gyro signals are all resynchronized to the sampling interval of the P1 processor CPU 212. The resynchronization process is described in detail with respect to FIGS. 12–16.

Also performed in the high frequency loop 270 is the coning compensation accumulation for the three resynchronized gyro signals. The accumulated coning compensation signals are used in the coning compensation as described hereinbelow. The resynchronized and accumulated $\Delta\theta_x$, $\Delta\theta_y$, and $\Delta\theta_z$ signals are passed to the compensation loop 280.

The temperature sense signals from the various inertial sensor assembly temperature sensors are monitored in a low frequency loop 290. Stored within the EEPROMS 260, 262 are temperature dependent coefficients for bias, scale factor and misalignment corrections used in compensating the $\Delta\theta_x$, $\Delta\theta_y$, $\Delta\theta_z$, $\Delta V_x$, $\Delta V_y$ and $\Delta V_z$ signals.

At the intermediate frequency loop 280, the P1 processor performs data compensation. The input resynchronized and accumulated gyro signals $\Delta\theta_x$, $\Delta\theta_y$ and $\Delta\theta_z$ from the high frequency loop 270 are compensated for bias and scale factor errors in compensation loop 280 by means of temperature dependent fourth order corrections to bias and scale factor provided by low frequency loop 290. Also, coning compensation for the gyro signals is produced by use of the accumulated coning compensation as provided by the high frequency loop 270.

The P1 processor, in low frequency loop 290, also draws on the fourth order polynomial temperature dependent models stored in the EPROM 240, 242 for the accelerometer signals $\Delta V_x$, $\Delta V_y$ and $\Delta V_z$ to provide bias, scale factor and misalignment correction for the compensation loop 280 accelerometer signals. In addition, sculling correction is provided for these signals to compensate for vibration induced outputs from the accelerometers. Inasmuch as the accelerometers are subject to output signals due to angular displacements, the sculling correction draws upon the gyro produced signals $\Delta\theta_x$, $\Delta\theta_y$, and $\Delta\theta_z$.

The compensating loop 280, therefore, also produces output compensated accelerometer signals $\Delta V_x$, $\Delta V_y$, and $\Delta V_z$.

Figure 7:
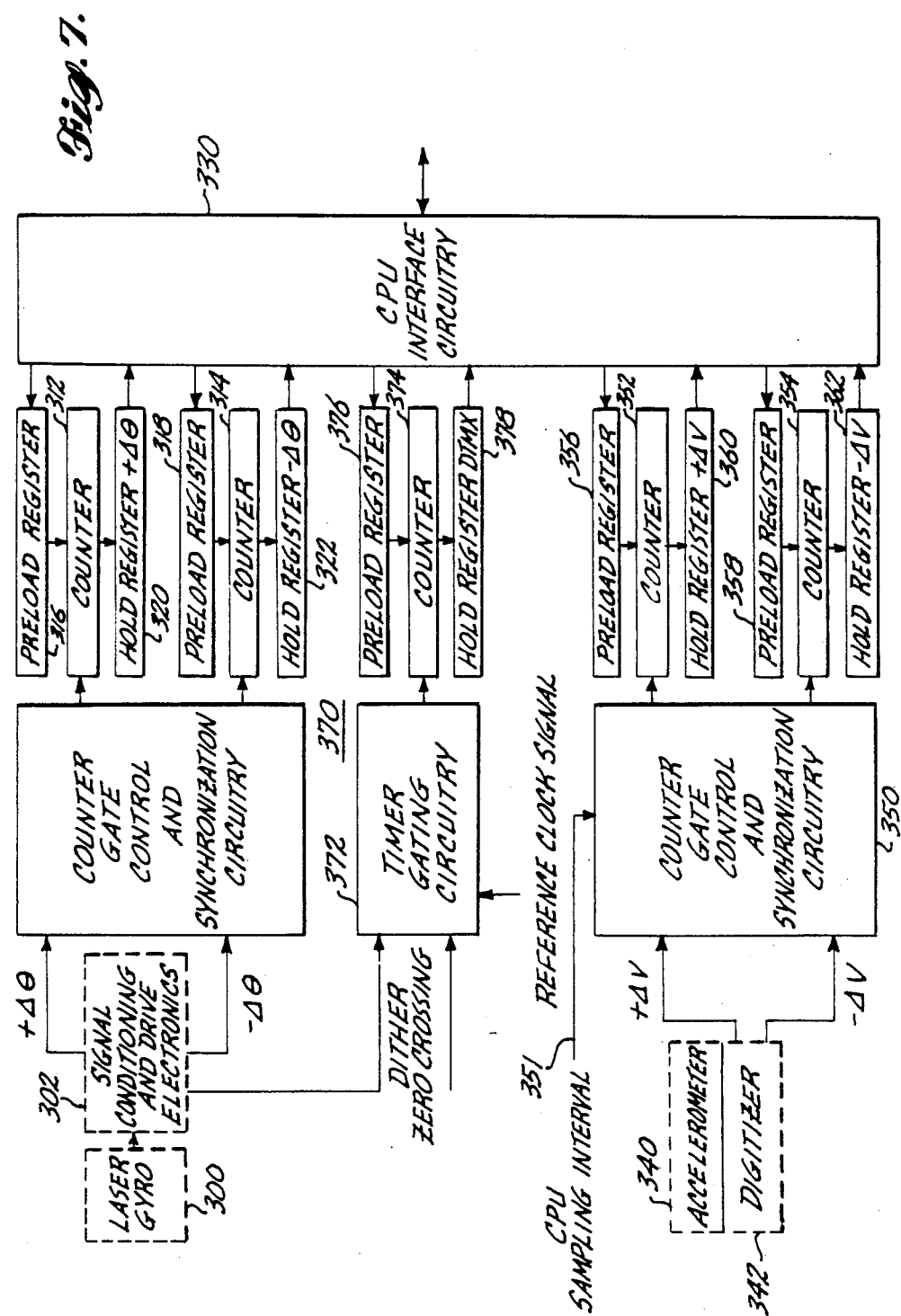
FIG. 7 is a detailed block diagram illustrating the arrangement of the counter banks used in the P1 processor.

FIG. 7 is a detailed block diagram illustrating the construction of one of the channel counter banks 202, 204, 206 of FIG. 5, as well as the resync timer 232 of FIG. 5.

As is discussed with respect to FIG. 3, each ring laser gyro 300, and its associated signal-conditioning electronics 302 produces two distinct output signals. The first output signal, designated $+\Delta\theta$, has a pulse repetition rate proportional to the angular displacement rate of the laser gyro 300 in a clockwise direction, whereas a second output signal, $-\Delta\theta$, has a pulse repetition rate proportional to angular displacement of the laser gyro 300 in a counter clockwise direction.

The $+\Delta\theta$ and $-\Delta\theta$ signals are passed to the input of counter gate control and synchronization circuitry 310. In a manner described in detail with respect to FIG. 8, the counter gate control and synchronization circuitry passes the $+\Delta\theta$ signals to a counter 312, whereas the $-\Delta\theta$ signals are passed to a counter 314. Each of the counters 312, 314 may be preloaded by a value stored in a preload register 316, 318, respectively, and the stored accumulated count in the counters 312, 314 may be held in associated hold registers 320, 322, respectively.

The preloaded values in the preload registers 316, 318 are controlled by CPU interface circuitry 330. Also, the CPU accesses the values stored in the hold registers 320, 332 via the CPU interface circuitry 330.

As is discussed with reference to FIG. 4, the accelerometer 340 and associated digitizer 342 produce a pair of output signals $+\Delta V$, $-\Delta V$. The $+\Delta V$ output signal has a pulse repetition rate proportional to acceleration of the accelerometer 340 along its sensitive axis in a reference positive direction. The $-\Delta V$ output signal has a pulse repetition rate corresponding to acceleration of the accelerometer 340 in a reference negative direction along its sensitive axis.

The $+\Delta V$, $-\Delta V$ signals are passed to the inputs of counter gate control and synchronization circuitry 350, which also receives a CPU sampling interval signal over line 351. In a manner described in detail with respect to FIG. 10, the counter gate control and synchronization circuitry 350 routes the $+\Delta V$ signal to the input of a counter 352, whereas the $-\Delta V$ signal is passed to the input of a counter 354. Each counter 352, 354 may be preloaded with a value determined by associated preload registers 356, 358, respectively. The accumulated counts in the counters 352, 354 may be loaded into, and stored within associated hold registers 360, 362, respectively. The preload registers 356, 358 may be activated to load a predetermined initial count into their corresponding counters 352, 354 under control of the P1 processor CPU, via the CPU interface circuitry 330. The P1 processor accesses the held accumulated counts in the hold registers 360, 362 via the CPU interface circuitry 330.

Also shown in FIG. 7 is the circuitry utilized for the resync timer, indicated generally at 370. The resync timer 370 includes timer gating circuitry 372 that receives as inputs the dither zero crossing signal, provided from the signal-conditioning electronics 302, the CPU sampling interval, which is the time at which the CPU accesses the various hold registers, such as hold registers 320, 322, 360, 362 to identify the status of the position sensors, and a reference clock signal. In a manner described in detail with respect to FIG. 8, the timer gating circuitry loads the reference clock signal into a counter 374. Counter 374 may be preloaded through an associated preload register 376. The accumulated count in counter 374 may be loaded into a hold register 378. The preload value for the counter 374 held in preload register 376 is activated by the P1 processor through the CPU interface circuitry 330. In addition, the P1 processor accesses the held resync timer count in the hold register 378 by means of the CPU interface circuitry 330.

Figure 8:
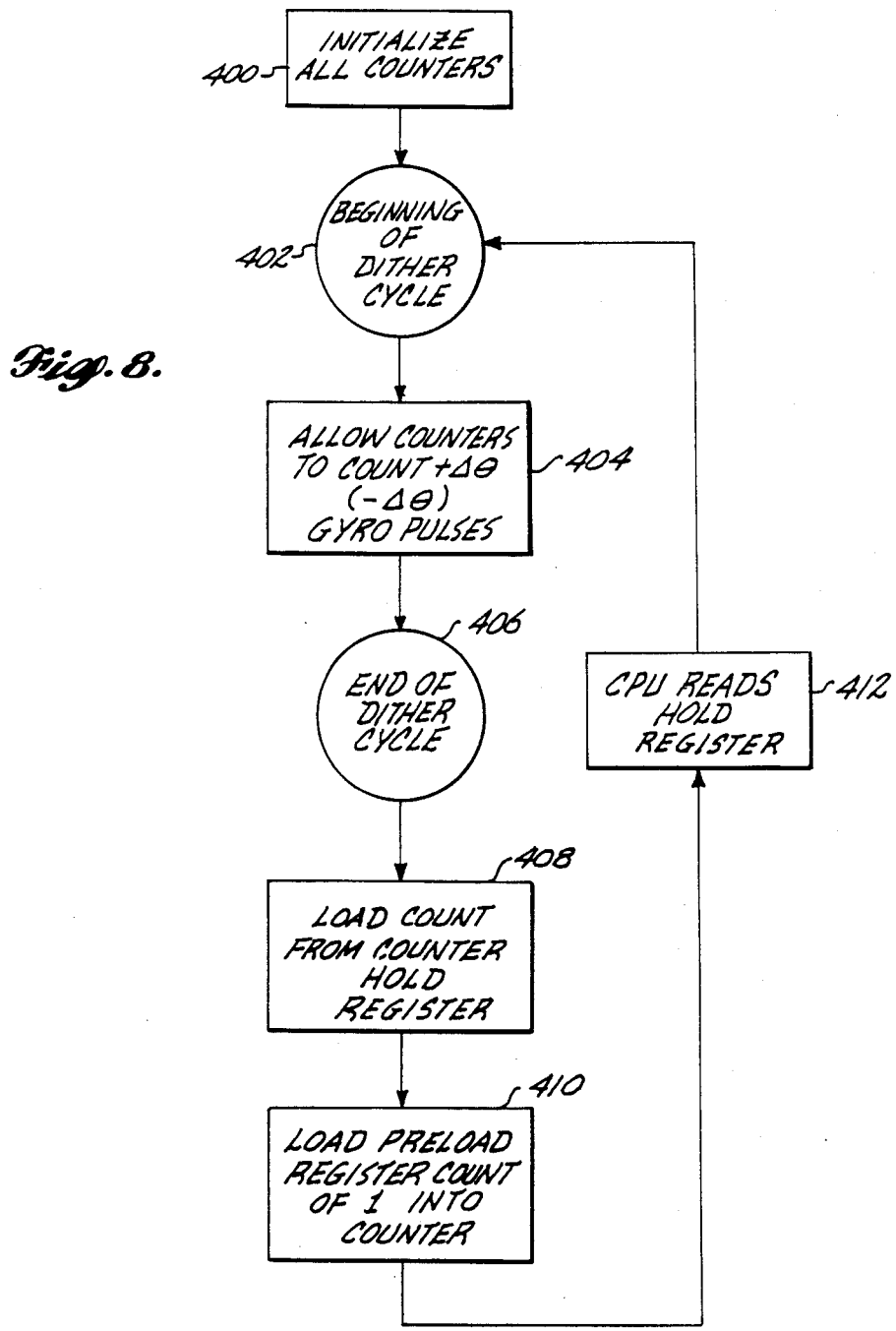
FIG. 8 is a logic flow diagram illustrating the processing of ring laser gyro produced pulse counts through the gyro counters.

FIG. 8 is a logic flow diagram illustrating the operation of the counter gate control and synchronization circuitry 310 (FIG. 6) and its associated counters 312, 314, preload registers 316, 318 and hold registers 320, 322.

At start-up, block 400, all counters and preload registers are initialized. Each preload register 316, 318 is preloaded with a count of 1, with each corresponding counter 312, 314, being loaded with an initial count of 1.

At the beginning of a dither cycle (i.e., at the negative zero crossing of the dither signal) at block 402, the counters, such as countes 312, 314, are allowed to count their corresponding $+\Delta\theta$, $-\Delta\theta$, respectively, gyro pulses at block 404. The counting at block 404 continues until the end of a dither cycle (i.e., at the negative zero crossing of the dither signal) at block 406. At this point, the accumulated counts in the counters 312, 314 are loaded into the corresponding hold registers 320, 322, respectively, at block 408.

At block 410, each preload register 316, 318 then preloads the count of 1 into its corresponding counter 312, 314. The purpose for preloading a count of 1 is that in one embodiment of the invention, the first pulse coupled through to the counters does not get counted.

At block 412 the P1 processor CPU reads the value stored in the hold registers 320, 322 at the CPU sampling rate. The cycle then repeats with the beginning of the dither cycle at 402.

Figure 9:
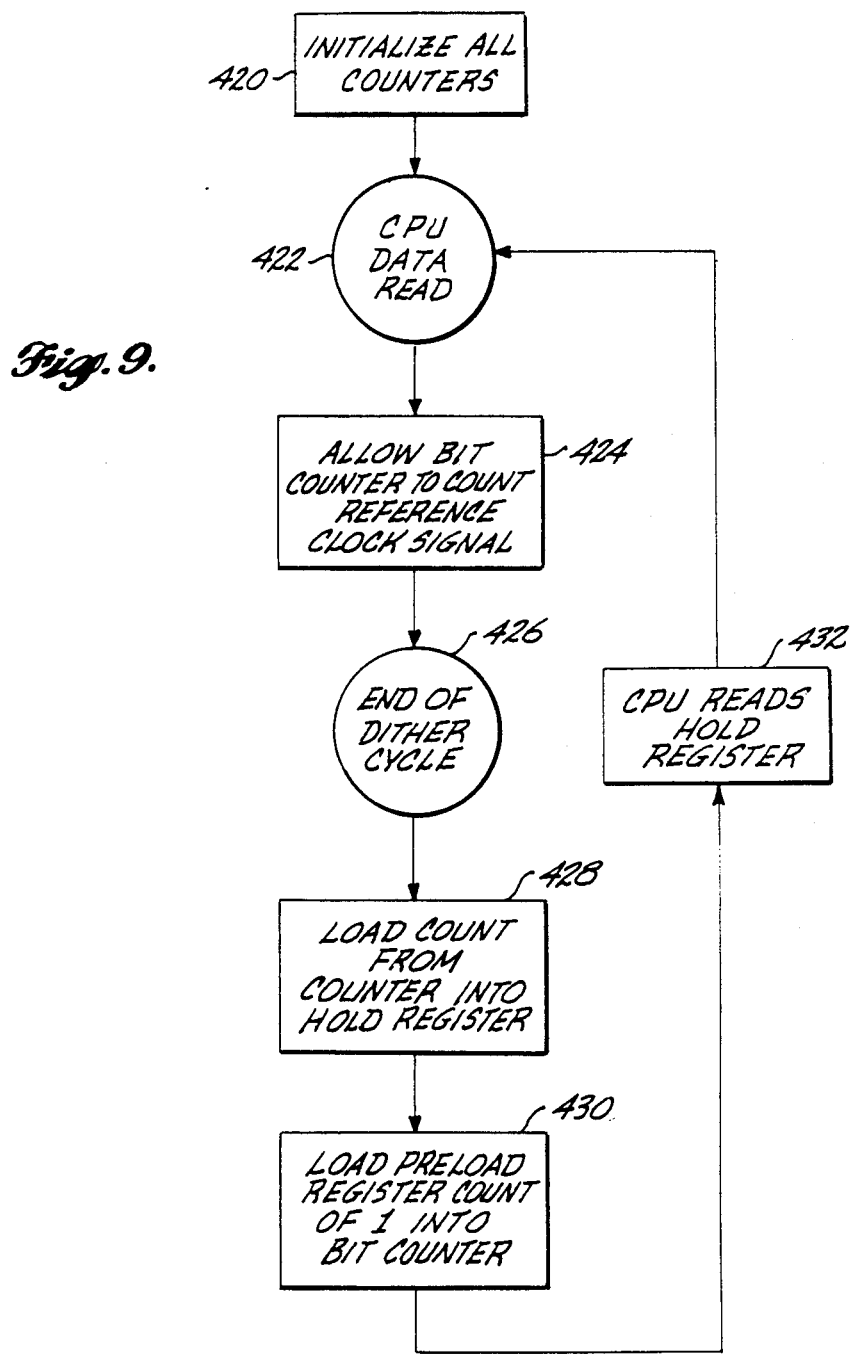
FIG. 9 is a logic flow diagram illustrating operation of the resync timer counter.

FIG. 9 is a detailed logic flow diagram illustrating the sequential steps performed by the timer gating circuitry 372, preload register 376, counter 374, and hold register 378 of FIG. 7. At start-up, block 420, each resync counter 374 is initialized with a count of 1, as is the preload register 376. At each CPU sampling interval, at block 422, counter 374 is allowed to count the reference clock signal at block 424. At 426, at the end of a dither cycle, i.e., at the negative zero crossing of the dither signal, the accumulated count in the counter 374 is loaded into its corresponding hold register 378, at block 428. At block 430 the preload count of 1 is then loaded from the preload register 376 into its associated counter 374. A preload of 1 is loaded into the counter 374 due to the fact that in one implementation of the invention the initial pulse applied to the counter 374 is not counted.

Finally, at its subsequent sampling interval the CPU, at block 432, reads the value of the hold register 378, the system then returning to repeat the cycle at 422.

Figure 10:
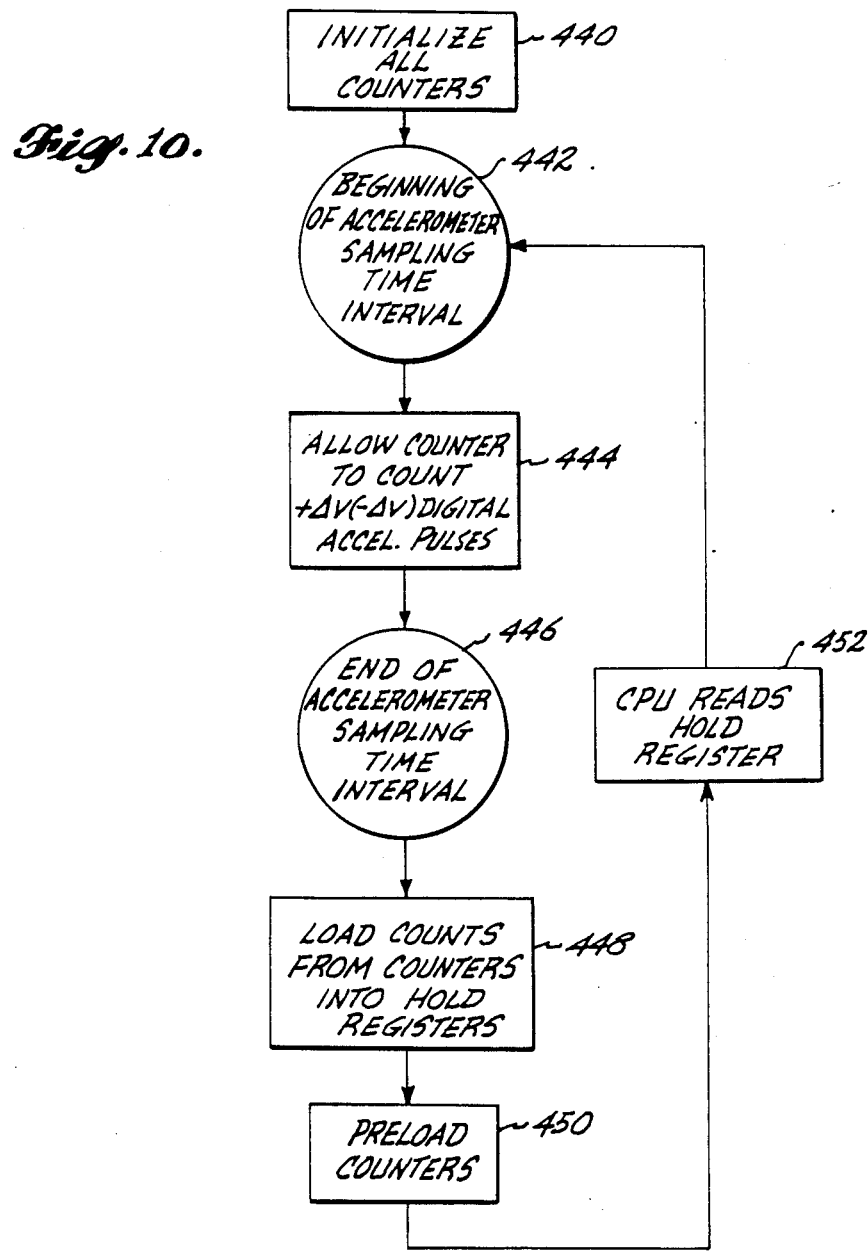
FIG. 10 is a logic flow diagram illustrating the processing of the accelerometer produced signals through the accelerometer counters.

FIG. 10 is a logic flow diagram illustrating the sequential steps performed by the counter gate control and synchronization circuitry 350, counters 352, 354, preload registers 356, 358, and hold registers 360, 362 of FIG. 7.

At start-up, block 440, the counters 352, 354 and corresponding preload registers 356, 358 are preloaded with a count of 0.

Then, upon the beginning of an accelerometer sampling time interval at 442, the counters 352, 354 are allowed to count the $+\Delta V$, $-\Delta V$ digital accelerometer pulses, respectively, at block 444. At the end of the accelerometer sampling time interval, at 446, the accumulated counts in the counters 352, 354 are loaded into the corresponding hold registers 360, 358 at block 448. At block 450 a preload pulse causes a preload of zero to be loaded into the counters 352, 354. At its sampling interval the CPU, at block 452, reads the held value in the hold registers 360, 362. The system then returns to repeat the cycle at 442.

Returning to FIG. 7, at each sampling period the P1 processor CPU (212 of FIG. 5) accesses the $+\Delta\theta$ accumulated count from hold register 320 for each gyro, and the $-\Delta\theta$ accumulated count in hold register 322 for each gyro. Inasmuch as the accumulated $+\Delta\theta$, $-\Delta\theta$ counts in the hold registers 320, 322 are taken over one complete dither cycle of the gyro, a simple subtraction of the count in hold register 322 from that in hold register 320 by the CPU produces a count proportional to the rate of angular displacement of the particular gyro, with the contribution due to gyro dither cancelled.

As discussed above, the three gyros in the gyro cluster are dithered asynchronously to prevent cross coupling between the gyros. Thus, the net $\Delta\theta$ count taken by the CPU at each sampling period represents change of displacement rates for each gyro at a different point in time. The navigational computations to be performed on the positional data in the P2 processor assume that each data point is taken at the same instant in time. Thus, to avoid error in the output of the IRS, the various gyro $\Delta\theta$ pulse counts must be synchronized to a common time interval. This time interval, in the preferred embodiment of the invention, is selected to be the sampling interval of the P1 processor CPU.

Figure 11:
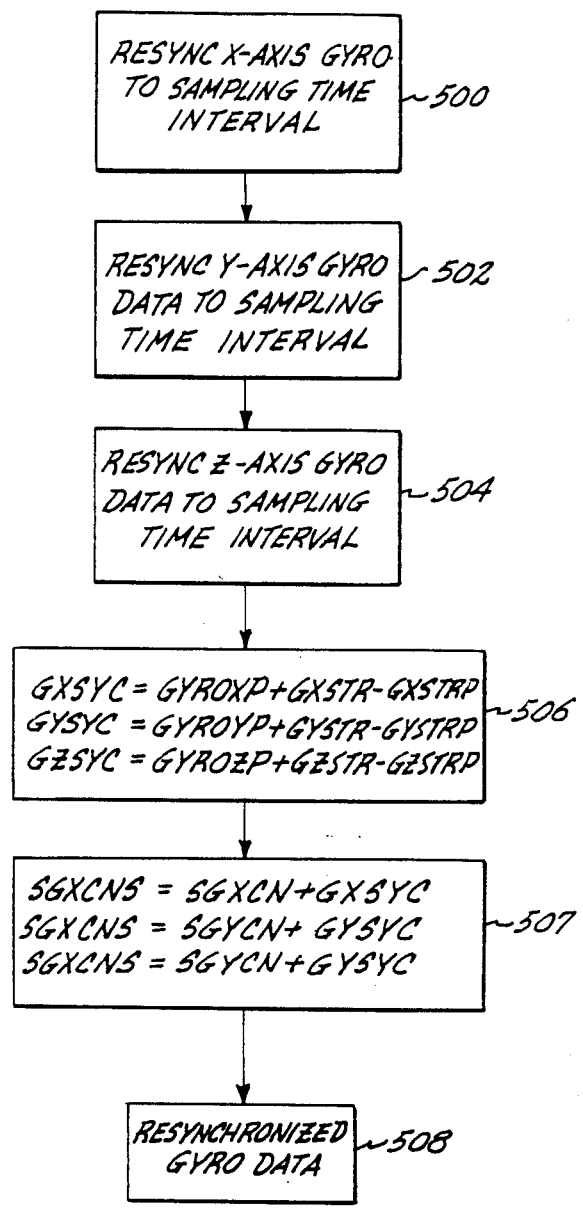
FIG. 11 is an overall flow diagram illustrating the sequential steps performed by the P1 processor in resynchronizing the gyro data for all three axes.

FIG. 11 is an overview flow diagram illustrating the sequential operations performed by the P1 processor (212 of FIG. 5) in performing the gyro data resynchronization. First, at block 500, the X axis gyro data is resynchronized to the sampling time interval of the P1 processor CPU. This is followed at blocks 502 and 504 by resynchronization of the Y axis, and Z axis, respectively, gyro data to the same P1 processor CPU sampling time interval. Once the resynchronization for all three axes has been accomplished, the CPU at 506 calculates the actual synchronized data value for each of the three axes at the previous CPU sampling time. The resynchronized X axis gyro value, GXSYC, is calculated as a previous net pulse count, GYROXP, for the X gyro over the previous dither cycle, plus an incremental count value, GXSTR, minus the incremental count value for the previous pass GXSTRP. Similar expressions for the resynchronized Y value, GYSYC, and resynchronized Z value, GZSYC, are performed at 506.

In block 507 the coning compensation accumulation is performed as:

SGXCNS = SGXCNS + GXSYC
SGYCNS = SGYCNS + GYSYC
SGZCNS = SGZCNS + GZSYC.

As is described with respect to FIG. 6, the accumulated coning compensation value is used to provide coning compensation for each gyro signal.

Figure 18:
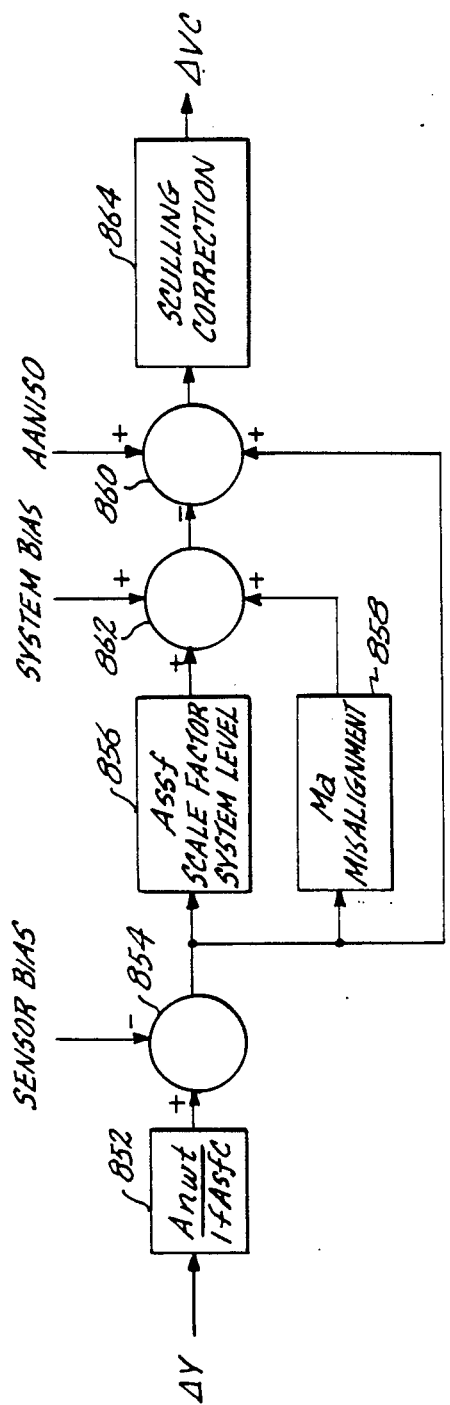
FIG. 18 is a flow chart illustrating the procedures performed by the P1 processor to provide accelerometer bias, scale factor misalignment, and sculling corrections.

At block 508, the resynchronized position data is then available for additional bias, misalignment and coning correction, as is fully described with respect to FIG. 18.

To assure that the stored gyro counts over each dither period are processed, the period of the P1 processor CPU sampling time must be shorter than the gyro dither period, i.e., the frequency of the P1 processor CPU sampling rate must be greater than the gyro dither frequency. Thus, for each CPU sampling interval, there are three different possible cases:

case 1—the present stored gyro data is valid (i.e., by valid, it is meant that the $\Delta\theta$ and $-\Delta\theta$ values stored in the hold registers have been updated since the previous CPU sampling interval) and the past gyro data was valid, case 2—the present gyro data is not valid, and case 3—the present gyro data is valid but the past gyro data was not valid.

The above three cases will repeat at varying rates dependent upon the ratio of the sampling period to the dither period. If the ratio of the sampling to the dither period is close to one, the sequence of the three cases will be relatively rare with case 1 occurring most of the time. However, if the ratio is relatively large, the frequency of the three cases will be high. Note that the only sequential cases allowable are, case 1 followed by case 1 or case 2, case 2 followed by case 3 and case 3 followed by case 1.

Figure 12:
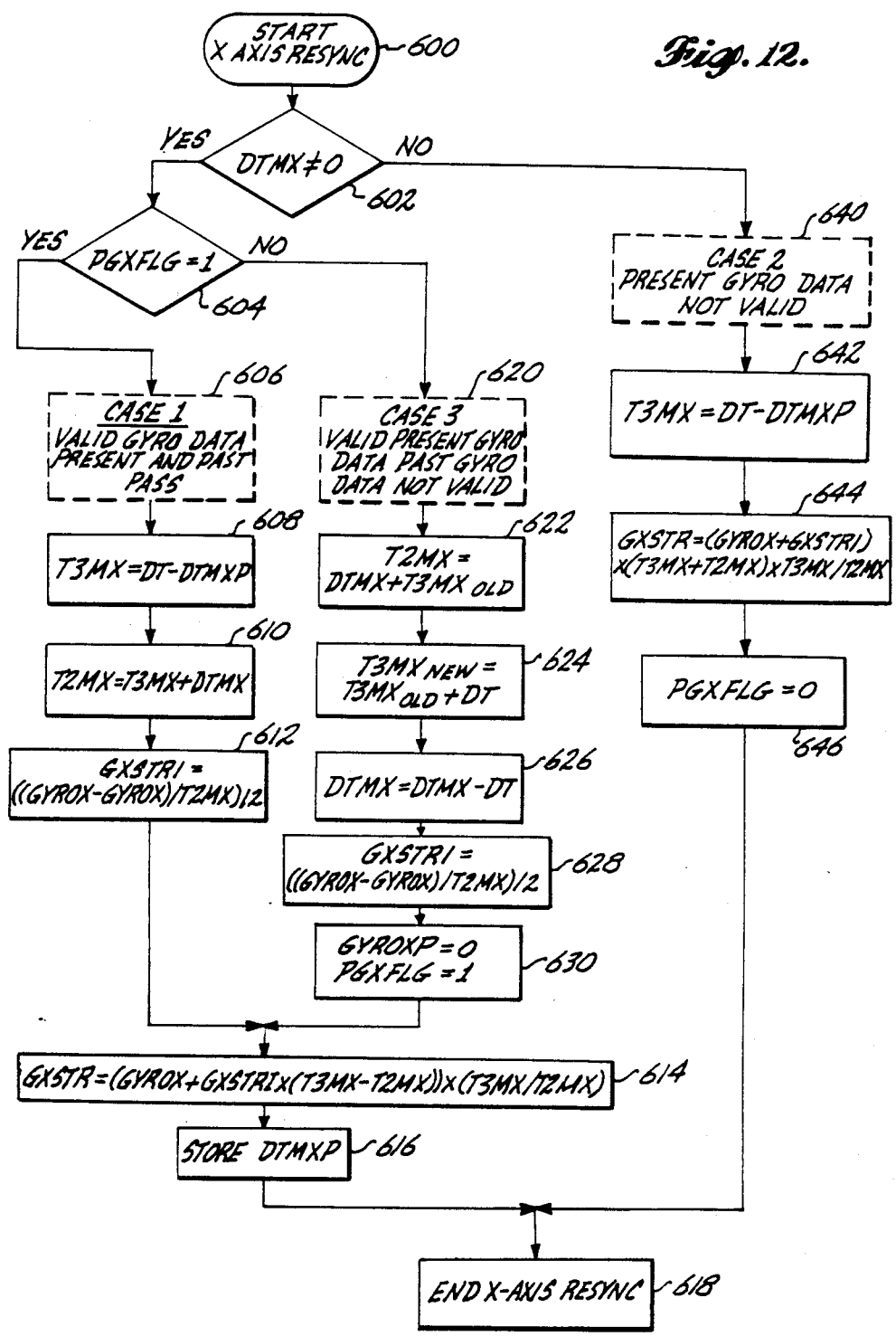
FIG. 12 is a detailed logic flow diagram illustrating the sequential steps performed by the P1 processor in resynchronizing gyro data for a single axis.

FIG. 12 is a logic flow diagram illustrating the sequential steps executed by the P1 processor CPU (212 of FIG. 5) for resynchronizing the X axis gyro data. Thus, this flow diagram corresponds to block 500 of FIG. 10. The same sequential steps of FIG. 12 are then performed for the Y data, corresponding to block 502 of FIG. 10, and the Z data, corresponding to block 504 of FIG. 11. As such, detailed logic flow diagrams for the resynchronization of the Y and Z data are not given herein.

Referring to FIG. 12, the X axis resynchronization begins at 600. The test is then made at block 602

DTMX≠0?

Figure 13:
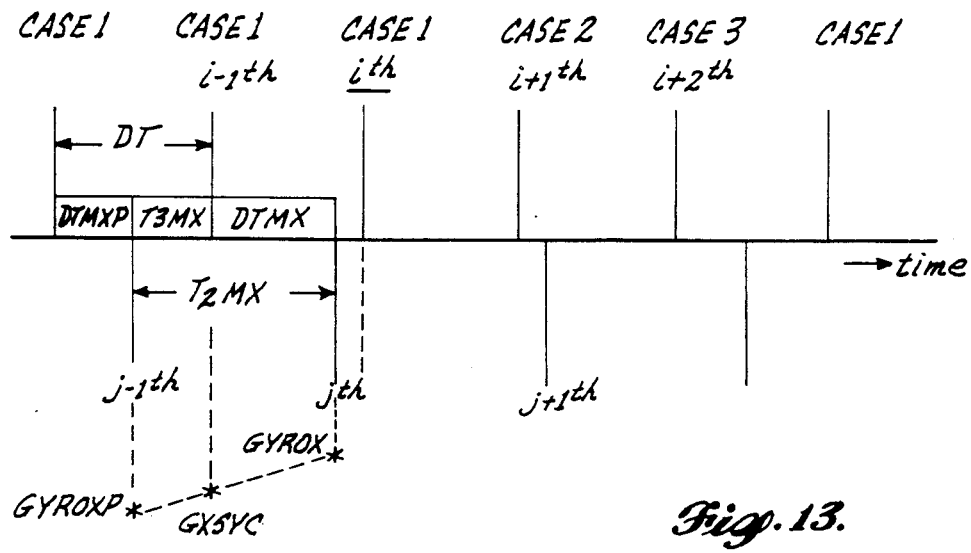
FIG. 13 is a timing chart illustrating a resynchronization case 1 condition wherein past and present gyro data are valid.

The value DTMX is the time interval determined by the resync timer 370 of FIG. 7. FIG. 13 is a timing diagram depicting the various time intervals used in a case 1 situation. Here, with time as the X axis, shown are sequential P1 processor CPU sampling time intervals i−1th, ith and so forth. The period between sampling intervals is designated DT.

Also shown are the X gyro asynchronous dither crossing intervals j−1th, jth and so forth. The period of each dither cycle is designated T2MX.

It will be recalled from FIG. 9 that the resync timer interval DTMX begins at each CPU sampling interval and ends at the successive dither crossing time. The previous resync timer period is designated DTMXP.

If the value DTMX does not equal zero, this means that the present gyro data is valid, i.e., the present gyro data value has been updated since the previous CPU sampling time. A test is then made at block 604 to determine whether or not the past data flag is set, i.e.,

PGXFLG=1.

The value PGXFLG is a flag which is set, as will be understood herein below, to indicate whether or not the previous sampled data value was valid. If the previous sampled data value was valid, the PGXFLG flag is set to 1. Thus, assuming for the present pass that PGXFLG=1, the system identifies, at block 606, that it is in a case 1 condition, i.e., valid past and present gyro data.

Referring again to FIG. 13, the net $\Delta\theta_x$ gyro count at the j=1th dither crossing is designated GYROXP. The net $\Delta\theta_x$ count at the jth dither interrupt is designated GYROX. Since, in case 1, both the GYROXP and GYROX values are valid, the P1 processor uses these values to interpolate, at the ith sampling interval, a value GXSYC which is a calculated $\Delta\theta_x$ value for the X gyro at the i=1th P1 processor sampling interval. The P1 processor uses a second order polynomial fit to calculate the value GXSYC. A full derivation of the terms used to interpolate this value is given with respect to FIG. 16. The discussion with respect to FIGS. 13–15 simply uses the results from this derivation.

At block 608, time T3MX, corresponding to the period between the j−1th dither crossing and the i−1th sampling interval, is calculated as

T3MX=DT−DTMXP.

Since the dither period T2MX is subject to some change, the precise dither period for the j−ith to jth dither crossing is calculated at block 610 as

T2MX=T3MX+DTMX.

The rate of change of gyro counts, GXSTRI, over the previous dither period is then calculated at block 612 as

GXSTRI=((GYROX−GYROXP)/T2MX)/2.

Then, at block 614 the delta gyro count, GXSTR, is calculated as

GXSTR=(GYROX+GX-
STRI×(T3MX−T2MX)(T3MX/T2MX).

The present resync timer interval DTMX is then stored, at block 616, for use in the next pass as the previous value DTMXP.

This completes the X axis resynchronization procedure at block 618, and the system then returns to block 506 to calculate the interpolated value GXSYC from the expression

GXSYC=GYROXP+GXSTR−GXSTRP.

Note that from this expression the delta term GXSTR is added to the past gyro count GYROXP to calculate the synchronized gyro count GXSYC. The past delta value GXSTRP is subtracted to conserve the total number of gyro counts.

Returning to the decision at 604 of FIG. 12, if the PGXFLG flag does not equal one, thereby indicating that the past gyro data was not valid, the system, at block 620, identifies a case 3 condition, i.e., valid present gyro data but past gyro data not valid.

Figure 14:
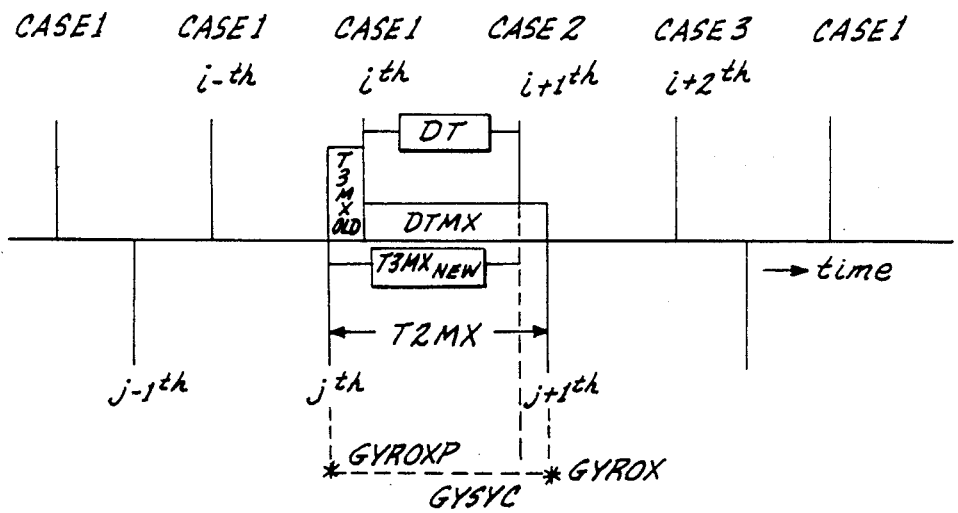
FIG. 14 is a timing chart illustrating a resynchronization case 2 condition wherein the present gyro data is not valid.

FIG. 14 is a timing diagram illustrating a case 3 condition. Here, at the i+2th sampling interval, the value DTMX does not equal zero, indicating that the present data value is valid. Notice, however, that for the ith through the i+1th sampling interrupt times, there was no dither zero crossing. Thus, at the previous P1 processor sampling interval i+1th time, the gyro data had not been updated and, thus, was not valid.

The procedure in a case 3 condition is to use the previous gyro data at the j and the j+1th dither crossing periods, GYROXP, GYROX, respectively, to interpolate, using a second order polynomial fit, the intermediate value GXSYC at the i+1th CPU sampling interval.

The first step, at block 622, is to calculate the dither period, T2MX, between the jth and j+1th dither crossings. This is accomplished by adding the current resync timer period DTMX to the previously calculated (i.e., calculated from the previous pass) T3MX signal

T2MX=DTMX+T3MX$_{OLD}$.

Then, at block 624, the new value T3MX interval between the jth dither crossing and the i+1th sampling interval is calculated

T3MX$_{NEW}$=DT+T3MX$_{OLD}$.

Notice now that the resync timer interval DTMX is equal to the interrupt interval DT plus an incremental interval between the i+1th sampling interrupt interval and the j+1th dither crossing interval. If this DTMX value is used in the next pass of the P1 processor at the i+3rd interval, an erroneous calculation will result from the use of this DTMX. Thus, a correction at 626 is made

DTMX=DTMX−DT.

The rate of change of gyro counts, GXSTRI, over the previous dither period is then calculated at 628

GXSTRI=((GYROX−GYROXP)/T2MX)/2.

At block 230 the past gyro data count GYROXP is set to zero to preserve counts due to the fact that the preceding case 2 pass already added these counts to the accumulators (blocks 507 of FIG. 11). Also, the past gyro data not valid flag, PGXFLG, is set to one, thereby indicating for the subsequent pass that the past data value was valid.

The delta gyro count, GXSTR, is calculated, at 614, as

GXSTR=(GYROX+GX-
STRI×(T3MX−T2MX)(T3MX/T2MX).

The value of DTMX is stored as DTMXP at 616 and the X axis resync is completed at 618.

Returning to 602 of FIG. 12, if

Figure 15:
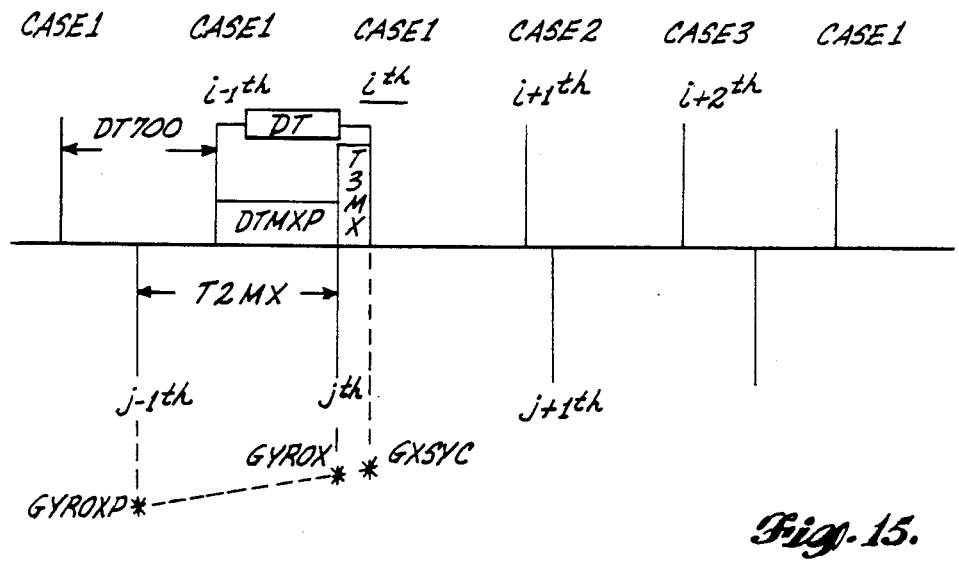
FIG. 15 is a timing chart illustrating a resynchronization case 3 condition wherein the present gyro data is valid but the past gyro data is not valid.

DTMX≠0 is not valid, the system identifies a case 2 condition at block 640. FIG. 15 illustrates the case 2 condition wherein the present gyro data is not valid. Here, the previous gyro data GYROXP and GYROX at the previous j−1th and jth, respectively, zero dither crossing intervals are used to extrapolate the resynced gyro data GXSYC at the ith P1 processor sampling interval.

Notice that for the i+1th sampling interval, there is no resync timer period DTMX because the j+1th dither crossing has not yet occurred. The first step, therefore, at block 642 is to calculate the time between the jth dither crossing and the ith sampling interval as

T3MX=DT−DTMXP, where DTMXP is the resync timer interval calculated for the previous resynchronization pass.

The dither period between the j−1th and jth dither crossings, T2MX, was also calculated in the previous pass. Also, the rate of change of gyro counts, GXSTRI, over the previous dither period was previously calculated.

Therefore, the delta gyro count, GXSTR, is calculated at block 644 as

GXSTR=(GRYOX+GX-
STRI(T3MX+T2MX))(T3MX/T2MX).

Then, at block 646, the past gyro data valid flag, PGXFLG, is reset to zero, thereby indicating for the subsequent pass that the past gyro data was not valid.

This completes the case 3 X axis resynchronization at block 618.

Figure 16:
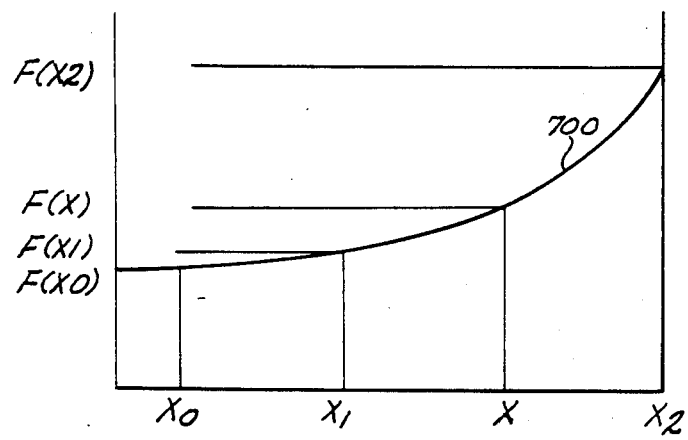
FIG. 16 is a graph illustrating the second-order polynomial fit used to interpolate and extrapolate resynchronization data.

As discussed above, the equations used for calculating the resynced gyro count value are based upon a second order polynomial fit. The derivation of these equations is understood with reference to FIG. 16. Shown in FIG. 16 is a plot of a graph 700 having ordinate values $x_0$, $x_1$ and $x_2$, with an unknown value, labeled x, to be approximated between $x_1$ and $x_2$. The coordinate values of these points are, correspondingly $F(x_0)$, $F(x_1)$ and $F(x_2)$, with the value $F(x)$ being the unknown value for the ordinate x.

The second order estimate of the polynomial defining the graph 700 is $$P(x) \triangleq F(x_1) + \frac{\Delta F(x_1)(x - x_1)}{1!(x_2 - x_1)^0} + \frac{\Delta^2 F(x_1)(x - x_1)(x - x_2)}{2!(x_2 - x_1)^1}$$

where $$\Delta F(x_1) = \frac{F(x_2) - F_1(x)}{(x_2 - x_1)}$$

and $$\Delta^2 F(x_1) = \frac{F(x_2) - F(x_1)}{x_2 - x_1} - \frac{F(x_1) - F(x_0)}{x_1 - x_0}$$

It is noted that $$x_1 - x_0 \approx x_2 - x_1$$

By rearranging terms $$P(x) \cong F(x_1) +$$

$$\frac{F(x_2)}{(x_2 - X_1)}(x - x_1) + \frac{(F(x_2) - F(x_1))(x - x_1)(x - x_2)}{2(x_2 - x_1)^2} +$$

$$\frac{F(x_1)(x - x_1)}{x_1 - x_0} + \frac{(F(x_1) - F(x_0))(x - x_0)(x - x_1)}{2(x_1 - x_0)^2}$$

Now, relating the terms of FIG. 16 to the terms defined with respect to FIGS. 13-14.

$$P(x) = GXSYC$$

$$F(x_1) = GYROXP$$

$$\frac{(F(x_2) - F(x_1))(x - x_1)(x - x_2)}{2(x_2 - x_1)} =$$

$$GXSTRI * \frac{(T3MX - T2MX) \times T3MX}{T2MX}$$

where $$\frac{F(x_2) - F(x_1)}{2(x_2 - x_1)} = GXSTRI$$

and $$x - x_1 = T3MX$$

$$x_2 - x_1 = T2MX.$$

Therefore, $$x - x_1 = T3MX - T2MX$$

then for the present x the estimate $P(x)$ is $$GXSYC = GRYOXP + GXSTR - GXSTRP$$

where $$GXSTR = (GRYOX + GXSTRI \times (T3MX - T2MX)) \times T3MX/T2MX$$

and

GXSTRP is the past GXSTR.

FIG. 17 is a flow chart illustrating the further compensation performed by the P1 processor on the resynced gyro count. Each of the three resynced gyro counts for the three coordinate axes, X, Y and Z, is processed in the manner depicted in FIG. 17, the only difference among channels being a change in compensation factors.

At block 802 the resynced gyro count is scaled by the pulse weight Gnwt and appropriate scale factor Gsfc. Each gyro produces a varying number of pulses for a given input. Thus, to get a calibrated weight for each gyro count, a gain factor Gnwt is applied at 802 corresponding to a nominal pulse weight, this term being divided by one plus the scale factor gain, Gsfc, a factor dependent upon the temperature of the individual gyro.

Each gyro also exhibits a unique bias characteristic which is also temperature dependent. Thus, a sensor bias term is subtracted from the output of block 802 in a summer 804.

The resultant count out of summer 804 is passed to the input of a system level scale factor gain block 806, a misalignment between sensors gain block 808, and to the input of a summer 810.

The system level scale factor block 806 applies a gain factor Gssf to adjust scale factor at the gyro cluster system level.

A correction factor Mg is applied at block 808 to correct known misalignments between the desired axial location of the gyro and its actual axial position.

The outputs from the gain factor blocks 806, 808 are passed to the inputs of a summer 812. Also passed to the input of summer 812 is a factor representative of a system bias error, i.e., a bias offset for the entire gyro cluster.

The resultant count out of summer 812 is combined in summer 810 along with factors corresponding to quantization correction and coning correction. The quantization correction term compensates for the fact that samples are taken at discrete quantum levels. Such correction is well known in sampling systems.

The coning correction term compensates for error in the output of each gyro due to environmental vibration to which each gyro is sensitive. As is described in detail with respect to FIG. 6, the coning correction values are accumulated in the high frequency resync routines and applied to the input of summer block 810.

The resultant count out of summer 810 is a count $\Delta\theta c$, which is a fully compensated and resynced term corresponding to the change of angular displacement of the corresponding gyro about its sensitive axis.

FIG. 18 is a flow diagram illustrating the compensation performed by the P1 processor on the accelerometer count, $\Delta V$. Referring again to FIG. 7, the P1 processor CPU (212 of FIG. 5) accesses the hold register for the counts $+\Delta V$ and $-\Delta V$ in hold registers 360, 362, respectively, at regular sampling intervals. The difference between the counts in the two hold registers produces a resultant acceleration count $\Delta V$.

In FIG. 18, the $\Delta V$ count for each channel is scaled at block 852. For a given acceleration, each accelerometer produces a different pulse output. To compensate for these differences, each pulse count is multiplied by a nominal weighting factor Anwt, and then divided by one plus a scale factor gain Asfc.

In this way, the output from block 852 is a calibrated pulse count.

Each accelerometer exhibits its own bias error. To correct for this error, the output from block 852 is summed with a sensor bias compensation signal in a summer 854.

The resultant count out of summer 854 is applied to the input of a system level scale factor block 856, the input of a misalignment gain factor block 858 and the input of a summer 860.

A gain factor Assf in block 856 adjusts the scale factor of each accelerometer in the triad.

A gain factor of Ma in block 858 adjusts the output of each accelerometer to correct for misalignments between the actual axis of the accelerometer, and its desired coordinate axis.

The outputs from gain blocks 856 and 858 are passed to the inputs of a summer 862. A further input to summer 862 is a system bias term to correct for an overall bias of the accelerometer triad.

The output from summer 862 is summed in summer 860 with a gain factor Aaniso. The gain factor Aaniso compensates for accelerometer output error caused by motion transmitted to each accelerometer due to the fact that the accelerometer is not located at the center of rotation of the inertial reference system. This is commonly known as anisoelastic correction.

The resultant output from summer 860 is passed to block 864 wherein sculling correction is applied. Each accelerometer is sensitive to vibration in its environment. If not compensated for, this vibration can lead to a net output error signal from the accelerometer. Using known techniques, a sculling correction factor is produced and applied as an input to block 864.

The output from the sculling correction block 864 is the fully compensated acceleration term $\Delta V_c$.

Referring again to FIG. 5, the P1 processor CPU 212 calculates synchronized and compensated values for each gyro count, and compensated values for each accelerometer count. These values, along with their appropriate label are then passed to the P2 processor for navigational calculations.

FIG. 19 is a block diagram illustrating the configuration of the preferred P2 navigational processor. The P1 processor data is received over the P1 processor address and data bus 210 which contains 16 lines. The P1 processor presents its data to the P2 processor in the form of a 16 bit label followed by a corresponding 16-bit data word.

These 16-bit labels and data words are received in two first-in and first-out registers 902, 904. The two registers 902, 904 are employed due to the fact that each register has an 8×256 capacity. The labels and data stored in the registers 902, 904 are accessed by the P2 processor CPU 910 via the P2 processor 16 line address and data bus 912. The CPU 910, preferably a type Z8002 commercially available unit, receives its timing signal from a conventional clock 914.

The programming for the P2 processor CPU 910 is contained within four EPROM's 920, 923, each of which is tied to the P2 processor address and data bus 912. In the preferred embodiment of the invention, each EPROM 920-923 has a memory capacity 16k×8. Stored within the EPROMS 920-923 are standard navigational equations which calculate the present position of the inertial reference based upon the delta angular displacement rates and delta velocity signals provided by the P1 processor. Inasmuch as such navigational equations are well known to this art, for purposes of conciseness they will not be presented herein.

During the course of its calculations, the P2 processor CPU 910 utilizes scratch pad memory provided by two RAM's 930, 932. In the preferred embodiment of the invention, each RAM 930, 932 has a memory capacity of 8k×8.

Based on its navigational calculations, the P2 processor CPU 910 produces on its address and data bus 912 output signals in a format suitable for use in the aircraft's avionics. Thus, these signals might be fed into the aircraft's flight control systems to fly the aircraft on a desired course, or they may be provided to flight deck instrumentation, indicating to the flight crew the location of the aircraft.

In summary, an improved inertial reference system has been described in detail. The organization of the system into an inertial sensor assembly, a P1 data acquisition, sensor compensation and gyro resynchronization processor and a P2 navigational computation processor provides numerous advantages. Compensation for the sensors may be quickly changed by rewriting new coefficients into the EEPROM within the P1 processor. A failure within any one of the three major organizational blocks of the system may be quickly corrected by replacing the failed modular unit with a fully compatible replacement unit. It has also been found that the present organization lends itself to construction of the IRS within a small chassis, thereby making the present IRS suitable for application in smaller vehicles, such as privately owned aircraft. In addition, the resynchronization technique employed by the P1 processor yields highly accurate gyro resynced data, while requiring a minimum of hardware components and thereby realizing a substantial savings in both cost of the system and system size.

While a preferred embodiment of the invention has been described in detail, it should be apparent that many modifications and variations thereto are possible, all of which fall within the true spirit and scope of the invention.

The embodiments of the invention in which an exclusive property or privilege is claimed are defined as follows:

1. An inertial reference system comprising: an inertial sensor assembly including:
(a) first, second and third ring laser gyros respectfully mounted for sensing angular deviation of said inertial sensor assembly about the X, Y and Z axes of an orthogonal coordinate system, said first ring laser gyro including means for producing first and second signals $+\Delta\theta_x$ and $-\Delta\theta_x$, having pulse repetition rates that are respectively proportional to the rate of clockwise and counterclockwise rotation of said first ring laser gyro about said X axis, said second ring laser gyro including means for producing third and fourth signals, $+\Delta\theta_y$ and $-\Delta\theta_y$, having pulse repetition rates that are respectively proportional to the rate of clockwise and counterclockwise angular displacement of said second ring laser gyro about said Y axis, said third ring laser gyro including means for producing fifth and sixth signals, $+\Delta\theta_z$ and $-\Delta\theta_z$, having pulse repetition rates that are respectively proportional to the rate of clockwise and counterclockwise angular displacement of said third ring laser gyro about said Z axis;

(b) accelerometer means for producing output signals $\Delta V_x$, $\Delta V_y$ and $\Delta V_z$ representative of the change in velocity of the inertial sensor assembly in said coordinate axes X, Y and Z, respectively;

dither means for cyclically and asynchronously dithering each of said first, second and third ring laser gyros;

a first processor, P1, for predeterminedly accessing and processing said first, second, third, fourth, fifth and sixth signals supplied by said first, second and third ring laser gyros and said $\Delta V_x$, $\Delta V_y$ and $\Delta V_z$ signals supplied by said accelerometer means, said P1 processor including:

(a) gyro counter means for accumulating over each dither cycle of said cyclically, asynchronous, dithering of said first, second and third ring laser gyros, said first, third and fifth signals $+\Delta\theta_x$, $+\Delta\theta_y$ and $+\Delta\theta_z$ supplied by said first, second and third ring laser gyros and for accumulating over each said dither cycle of said cyclically, asynchronous dithering of said first, second and third ring laser gyros, said second, fourth and sixth signals $-\Delta\theta_x$, $-\Delta\theta_y$ and $-\Delta\theta_z$ supplied by said first, second and third ring laser gyros;

(b) gyro storage means for storing said accumulated pulse counts for each of said signals $+\Delta\theta_x$, $+\Delta\theta_y$, $+\Delta\theta_z$, $-\Delta\theta_x$, $-\Delta\theta_y$ and $-\Delta\theta_z$;

(c) logic means for periodically sampling said gyro storage means and predeterminedly processing said stored pulse counts for producing a seventh signal, $\Delta\theta_x$, representative of the angular rate of said first ring laser gyro, an eighth signal, $\Delta\theta_y$, representative of the angular rate of said second ring laser gyro, and a ninth signal, $\Delta\theta_z$, representative of the angular rate of said third ring laser gyro, each said signal $\Delta\theta_x$, $\Delta\theta_y$ and $\Delta\theta_z$ being synchronized to a common interval, said logic means including means for resynchronizing each stored pulse count to each logic means sampling time;

(d) means for coning correction for said $\Delta\theta_x$, $\Delta\theta_y$ and $\Delta\theta_z$ signals;

(e) means for sculling correction for said $\Delta V_x$, $\Delta V_y$ and $\Delta V_z$ signals;

(f) means for temperature compensating said $\Delta\theta_x$, $\Delta\theta_y$, $\Delta\theta_z$, $\Delta V_x$, $\Delta V_y$ and $\Delta V_z$ signals; and means for supplying signals that are representative of said temperature, sculling and coning compensated signals; and, a second processor, P2, for performing navigational computations with the temperature, sculling and coning compensated signals supplied by said P1 processor.

2. The inertial reference system of claim 1, wherein the period of each dither cycle is larger than the sampling period of said logic means and wherein said P1 processor further comprises:

a clock for producing a periodic signal having a significantly higher frequency than the frequency of said logic means sampling period;

resync timer means for accumulating a count of said clock signal during the interval between the end of each dither cycle for each ring laser gyro and each subsequent logic sampling time; and wherein said logic means predeterminedly processes said stored pulse counts and said resync timer means stored count for synchronizing each ring laser gyro-produced signal to said logic means sampling interval.

3. The inertial reference system of claim 2, wherein said logic means includes means for identifying a first condition wherein the sampled pulse count was updated from the previous sampling interval and a second condition wherein, due to the dither period being longer than the logic means sampling period, the sampled pulse count remained the same as the previous sampled pulse count and, in response to said first condition, interpolating a value for said resynchronized pulse count between the sampled pulse counts for the preceding two dither cycles and, in response to said second condition, extrapolating a value for said resynchronized pulse count from the sampled pulse counts for the preceding two dither cycles.

4. The inertial reference system of claim 1, wherein said accelerometer means comprises a triad of three accelerometers, each accelerometer being mounted to sense acceleration of said inertial sensor assembly in one of said X, Y, and Z coordinate axes, each accelerometer producing a first output signal $+\Delta V_x$, $+\Delta V_y$, $+\Delta V_z$ having a pulse repetition rate proportional to the acceleration of said accelerometer in a reference positive direction and a second output signal $-\Delta V_x$, $-\Delta V_y$, $-\Delta V_z$ having a pulse repetition rate proportional to acceleration in a reference negative direction of said accelerometer.

5. The inertial reference system of claim 4, wherein said P1 processor includes:

accelerometer counter means for accumulating the pulse count of each accelerometer-produced first output signal $+\Delta V_x$, $+\Delta V_y$ and $+\Delta V_z$ and each accelerometer-produced second output signal $-\Delta V_x$, $-\Delta V_y$ and $-\Delta V_z$ over a predetermined periodic interval;

accelerometer storage means for storing said accumulated pulse counts for each of said output signals $+\Delta V_x$, $+\Delta V_y$, $+\Delta V_z$, $-\Delta V_x$, $-\Delta V_y$ and $-\Delta V_z$ over each of said predetermined periodic intervals; and means for periodically sampling said acclerometer storage means and predeterminedly processing said stored pulse counts.

6. The inertial system of claim 1, wherein said means included in said P1 processor means for temperature compensating said $\Delta\theta_x$, $\Delta\theta_y$, $\Delta\theta_z$, $\Delta V_x$, $\Delta V_y$ and $\Delta V_z$ signals includes means for:

(i) monitoring the temperature of said first, second and third ring laser gyros, (ii) monitoring the temperature of said accelerometer means, (iii) storing predetermined coefficients for said first, second and third ring laser gyros and for said accelerometer means, said coefficients providing correction factors for the output signals produced by said first, second and third ring laser gyros and for said accelerometer means as a function of temperature; and (iv) means for producing temperature compensated $\Delta\theta_x$, $\Delta\theta_y$, $\Delta\theta_z$, $\Delta V_x$, $\Delta V_y$, and $\Delta V_z$ signals responsive to said monitored temperatures and said stored coefficients.

7. The inertial reference system of claim 6, wherein said means for storing predetermined coefficients includes electrically erasable, programmable read-only memory (EEPROM) such that said coefficients can be changed by erasing previous coefficients and writing in new coefficients.

8. The inertial reference system of claim 1, wherein said P1 processor further includes means for:
 (e) providing bias-related correction for said $\Delta\theta_x$, $\Delta\theta_y$, $\Delta\theta_z$, $\Delta V_x$, $\Delta V_y$, and $\Delta V_z$ signals;
 (f) providing misalignment-related correction for said $\Delta V_x$, $\Delta V_y$, and $\Delta V_z$ signals; and
 (g) providing scale factor-related correction for said $\Delta\theta_x$, $\Delta\theta_y$, $\Delta\theta_z$, $\Delta V_x$, $\Delta V_y$, and $\Delta V_z$ signals.

* * * * *